(12) United States Patent
Botto et al.

(10) Patent No.: US 9,671,520 B2
(45) Date of Patent: Jun. 6, 2017

(54) DIELECTRIC LOADED PARTICLE ACCELERATOR

(71) Applicant: Euclid Techlabs, LLC, Solon, OH (US)

(72) Inventors: Tancredi Botto, Cambridge, MA (US); Benjamin Levitt, Boston, MA (US); Chunguang Jing, Naperville, IL (US); Sergey Antipov, Darien, IL (US); Alexei Kanareykin, Gaithersburg, MD (US)

(73) Assignees: Euclid Techlabs, LLC, Gaithersburg, MD (US); Schlumberger Technology Corporation, SugarLand, TX (US)

( * ) Notice: Subject to any disclaimer, the term of this patent is extended or adjusted under 35 U.S.C. 154(b) by 0 days.

(21) Appl. No.: 14/175,703

(22) Filed: Feb. 7, 2014

(65) Prior Publication Data
US 2015/0230326 A1   Aug. 13, 2015

(51) Int. Cl.
*G01V 5/12*   (2006.01)
*H05H 9/02*   (2006.01)
(Continued)

(52) U.S. Cl.
CPC ............... *G01V 5/12* (2013.01); *H01J 35/00* (2013.01); *H05G 2/00* (2013.01); *H05H 9/02* (2013.01)

(58) Field of Classification Search
CPC  H05H 9/00; H05H 9/005; H05H 9/02; H05H 9/04; H05H 7/22; E21B 49/00;
(Continued)

(56) References Cited

U.S. PATENT DOCUMENTS

| 2,375,223 A | 5/1945 | Hansen et al. |
| 2,394,008 A | 2/1946 | Pierce |

(Continued)

OTHER PUBLICATIONS

Jame, Waves in inhomogeneous Isotropic Media, 1961, PhD Thesis, The University of British Columbia, 80 pages.*

(Continued)

*Primary Examiner* — David J Makiya
*Assistant Examiner* — John Corbett
(74) *Attorney, Agent, or Firm* — Maine Cernota & Rardin

(57) ABSTRACT

A dielectric loaded accelerator for accelerating charged particles, such as electrons, ions and/or protons, is described herein. The dielectric loaded accelerator accelerates charged particles along a longitudinal axis and towards an outlet of the accelerator. The dielectric loaded accelerator accelerates the charged particles using oscillating electromagnetic fields that propagate within the accelerator according to an electromagnetic mode. The dielectric loaded accelerator described herein includes an electromagnetic mode with a phase velocity that increases towards the outlet of the accelerator and matches a velocity of the charged particles being accelerated along the longitudinal axis of the accelerator. By matching the phase velocity of the oscillating electromagnetic fields to the velocity of the charged particles, the accelerator reduces phase slippage between the fields and the charged particles and, therefore, efficiently accelerates charged particle towards the outlet.

28 Claims, 11 Drawing Sheets

(51) Int. Cl.
*H01J 35/00* (2006.01)
*H05G 2/00* (2006.01)

(58) Field of Classification Search
CPC . G01V 5/12; G01V 5/125; G01V 5/04; G01V 3/30; H05G 2/00; H01P 7/10; H01P 3/16; H01P 5/024; H01P 11/002; H01P 1/16; H01P 3/12; H01P 3/122; H01P 3/13; H01P 5/103; H01P 5/107; H03F 3/602; H03F 2200/192; H03F 2200/198; H03F 2200/204; H03F 2200/423; H03F 2200/451; H03F 2200/543; H03F 3/195; H03F 3/211; H03F 3/60; H03B 1/02; H03B 5/1817; H03B 21/01; A61N 2005/1087; A61N 5/1043; A61N 5/1077; H03C 7/02; H03L 7/00
See application file for complete search history.

(56) References Cited

U.S. PATENT DOCUMENTS

| | | | |
|---|---|---|---|
| 2,790,149 A | | 4/1957 | Robertson-Shersby-Harvie et al. |
| 2,880,353 A | * | 3/1959 | Mourier .................. H05H 9/02 315/3.5 |
| 3,020,439 A | | 2/1962 | Eichenbaum |
| 3,133,198 A | * | 5/1964 | Kaminow ............. G02F 1/0344 330/4 |
| 3,324,340 A | | 6/1967 | Pinel at al. |
| 3,336,495 A | * | 8/1967 | Loew ....................... H05H 7/08 315/3 |
| 3,906,300 A | | 9/1975 | Tran |
| 4,024,426 A | | 5/1977 | Vaguine |
| 4,079,285 A | | 3/1978 | Little |
| 4,712,074 A | | 12/1987 | Harvey |
| 5,532,210 A | * | 7/1996 | Shen ........................ H05H 7/20 315/3.5 |
| 6,011,520 A | * | 1/2000 | Howell .................. H01Q 13/10 343/767 |
| 6,229,327 B1 | * | 5/2001 | Boll ................... G01R 1/06772 324/755.02 |
| 7,768,187 B2 | | 8/2010 | Kanareikin et al. |
| 7,898,193 B2 | | 3/2011 | Miller et al. |
| 2009/0274276 A1 | * | 11/2009 | Wraight .................. H01J 35/06 378/89 |

OTHER PUBLICATIONS

Schoessow et al., Beam-driven linear and nonlinear THz source technology, 2012, SPIE, vol. 8363, pp. 0V-1 to 0V-14.*
Jing et al., 34.272 GHz Multilayered Dielectric-Loaded Accelerating Structure, IEEE, Proceedings of 2005 Particle Accelerator Conference, pp. 1592-1594.*
Han et al., Axially Periodic Dielectric-Loaded Circular Waveguide for Microwave/Millimeter-Wave Device, 2012, IEEE Transactions on Plasma Science, vol. 40, No. 12, pp. 3420-3426.*
Kesari et al., Modelling of axially periodic circular waveguide with combined dielectric and metal loading, 2005, Journal of Physics D: Applied Physics, vol. 38, pp. 3523-3529.*
Kesari et al., Analysis of a Circular Waveguide Loaded with Dielectric and Metals Discs, 2011, Progress in Electromagnetics Research, vol. 111, pp. 253-269.*
Jain et al., "Modular 20kW solid state RF amplifier for Indus-2 synchrotron radiation source", available online Feb. 27, 2012, Nuclear Instruments and Methods in Physic Research A, vol. 676, pp. 74-83.*
Oz et al., "High-efficiency, single-ridged, 16-way Radial Power Combiner", 1991, IEEE, 21th European Microwave Conference, vol. 2, pp. 1029-1034.*
Fathy et al., "A simplified design approach for radial power combiners", 2006, IEEE Transactions on Microwave Theory and Techniques, vol. 54, No. 1, pp. 247-255.*
Russell, "Microwave power Combining Techniques", 1979, IEEE Transactions on Microwave Theory and Techniques, vol. MTT-27, No. 5, pp. 472-478.*
Bruck et al., "Slow Transverse Magnetic Waves in Cylindrical Guides," Journal of Applied Physics, Aug. 1947, vol. 18: pp. 766-769.
Flesher et al., "Dielectric Loading for Waveguide Linear Accelerators," AIEE Transactions, 1951, vol. 70: pp. 887-893.
Frankel, "TM0,1 Mode in Circular Wave Guides with Two Coaxial Dielectrics," Journal of Applied Physics, Jul. 1947, vol. 18: pp. 650-655.
Ghosh et al., "Analytical Exploration of New Tapered-Geometry Dielectric-Supported helix Slow-Wave Structures for Braodband TWT's," Progress in Electromagnetics Research, PIER, 1997, vol. 15: pp. 63-85.
Gold et al., "MOP130: New Studies of X-Band Dielectric-Loaded Accelerating Structures," Proceedings of Particle Accelerator Conference, 2011: pp. 337-339.1.
Gore et al., "Enhanced Efficiency of Cerenkov Free Electron Lasers Using Tapered Dielectric Layers," Physica Scripta, 1996, vol. 53: pp. 62-68.
Hill et al., "High-Gradient Millimeter-Wave Accelerator on a Planar Dielectric Substrate," Physical Review Letters, Aug. 2001, vol. 87(9): pp. 094801-1-094801-4.
Jing et al., "Progress on High Power Tests of Dielectric-Loaded Accelerating Structures," Proceedings of Particle Accelerator Conference, 2005: pp. 1566-1568.
Le Floch et al., "Low-loss materials for high Q-factor Bragg reflector resonators," Applied Physics Letters, 2008, vol. 92: pp. 032901-1-032901-3.
Oliner, "Remarks on Slow Waves in Cylindrical Guides," Journal of Applied Physics, Jan. 1948, vol. 19: pp. 109-110.
Schachter et al., "Efficiency Increase in a Traveling Wave Tube by Tapering the Phase Velocity of the Wave," Intense Microwave and Particle Beams II, 1991, vol. 1407: pp. 44-56.
Shersby-Harvie et al., "A Proposed New Form of Dielectric-loaded Wave-Guide for Linear Electron Accelerators," Nature, Dec. 1948, vol. 162: pp. 890.
Shersby-Harvie et al., "A Theoretical and Experimental Investigation of Anisotropic-Dielectric-Loaded Linear Electron Accelerators," Proceedings of the IEE—Part B: Radio and Electronic Engineering, 1957, vol. 104: pp. 273-290.
Shimoda, "Proposal for an Electron Accelerator Using an Optical Maser," Applied Optics, Jan. 1962, vol. 1(1): pp. 33-36.
Walker et al., "Mode Separation at the π-Mode in a Dielectric Loaded Waveguide Cavity," Proceedings of the IEE—Part C: Monographs, 1957, vol. 104: pp. 381-387.
Walker et al., "Vacuum Breakdown in Dielectric-loaded Waveguides," Nature, Jan. 1958, vol. 181: pp. 38-39.
Yeh et al., "Theory of Bragg fiber," J. Opt. Soc. Am., Sep. 1978, vol. 68(9): pp. 1196-1201.
Zou et al., "Construction and testing of an 11.4 GHz dielectric structure based traveling wave accelerator," Review of Scientific Instruments, Jun. 2000, vol. 71(6): pp. 2301-2304.
U.S. Appl. No. 13/566,539, filed Aug. 3, 2012 (60.1976-US-NP): pp. 1-22.
U.S. Appl. No. 13/566,555, filed Aug. 3, 2012 (60.1976A-US-NP): pp. 1-21.

* cited by examiner

DIELECTRIC LOADED PARTICLE ACCELERATOR

TECHNICAL FIELD

This disclosure relates to particle accelerators, and more particularly to dielectric loaded accelerators.

BACKGROUND

Linear accelerators (LINACs) are used to accelerate charged particles, such as electrons, protons, or ions, along a linear axis. In one example, a LINAC includes a number of resonant cavities that are disposed along an evacuated beamline. The resonant cavities are powered by a microwave source that provides oscillating electromagnetic fields within each resonant cavity. As the charged particles travel along the beamline, the oscillating electromagnetic fields within each resonant cavity are applied to the particles along acceleration gaps. In this manner, energy is transferred from the oscillating electromagnetic fields within the cavities to the charged particles so that the particles are accelerated.

The resonant cavities include an electromagnetic mode and, for charged particles travelling at sub-relativistic velocities, the mode across the resonant cavities is set to an appropriate phase velocity so that the oscillating electromagnetic fields are synchronized with the velocity of the charged particles travelling along the beamline. Otherwise, phase slippage may occur between the oscillating electromagnetic fields and the charged particles. Phase slippage produces inefficient transfer of energy from the oscillating electromagnetic fields to the charged particles and can inhibit net acceleration of charged particles.

LINACs compensate for phase slippage at sub-relativistic particle velocities by using shorter acceleration gaps and resonant cavity lengths (e.g., approximately ⅓ the oscillating electromagnetic field wavelength). Short acceleration gaps, however, are less efficient in transferring energy to the charged particles and more prone to instabilities, such as multipactor discharges and secondary electron emission. Furthermore, short acceleration gaps are more difficult to fabricate for very low velocity accelerators or may require greater electron injection energies. For example, the electron injection energy may be on the order of approximately 100 KeV or more. To generate high electron injection energies, LINACs use a high voltage system with high voltage insulation. These high voltage components increase the size and spacing requirements of the LINAC and constrain the design of the LINAC.

SUMMARY

Illustrative embodiments of the present disclosure are directed to a device for accelerating charged particles. The device includes a dielectric loaded accelerator for accelerating charged particles along a longitudinal axis of the accelerator and towards an outlet of the accelerator. The dielectric loaded accelerator also includes an electromagnetic mode with a phase velocity that (i) increases towards the outlet of the accelerator and (ii) matches a velocity of the charged particles accelerated along the longitudinal axis.

In one embodiment, the dielectric loaded accelerator includes a dielectric material with a thickness that decreases along the longitudinal axis and towards the outlet of the accelerator to produce the increasing phase velocity along the longitudinal axis of the accelerator.

In another embodiment, the dielectric loaded accelerator includes a dielectric material with a dielectric permittivity that decreases along the longitudinal axis of the accelerator and towards the outlet of the accelerator to produce the increasing phase velocity along the longitudinal axis.

Various embodiment of the present disclosure are directed to an X-ray generator. The X-ray generator includes a target for generating X-rays, a dielectric loaded accelerator for accelerating electrons along a longitudinal axis of the accelerator and towards the target, and an electron source for providing electrons to the accelerator. The dielectric loaded accelerator includes an electromagnetic mode with a phase velocity that increases towards the target and matches a velocity of the electrons accelerated along the longitudinal axis.

In some embodiments, the X-ray generator is part of a wellbore tool and the X-ray generator generates X-ray radiation that enters an earth formation. The wellbore tool comprises a gamma-ray detector for detecting X-ray radiation scattered from the earth formation.

Further embodiments of the present disclosure are directed to a method for accelerating charged particles. The method includes providing charged particles to a dielectric loaded accelerator. The accelerator includes a longitudinal axis and an electromagnetic mode with a phase velocity that increases along the longitudinal axis of the accelerator and towards an outlet of the accelerator. The method further includes driving the accelerator using a microwave signal to accelerate the charged particles along the longitudinal axis and towards the outlet of the accelerator.

BRIEF DESCRIPTION OF THE DRAWINGS

Those skilled in the art should more fully appreciate advantages of various embodiments of the disclosure from the following "Description of Illustrative Embodiments," discussed with reference to the drawings summarized immediately below.

DESCRIPTION OF ILLUSTRATIVE EMBODIMENTS

Illustrative embodiments of the present disclosure are directed to a device and method for accelerating charged particles, such as electrons, ions and/or protons. The device includes a dielectric loaded accelerator that accelerates charged particles along a longitudinal axis and towards an outlet. The dielectric loaded accelerator accelerates the charged particles using oscillating electromagnetic fields that propagate within the accelerator according to an electromagnetic mode. The dielectric loaded accelerator described herein includes an electromagnetic mode with a phase velocity that increases towards the outlet of the accelerator and matches a velocity of the charged particles being accelerated along the longitudinal axis of the accelerator. By matching the phase velocity of the oscillating electromagnetic fields to the velocity of the charged particles, the accelerator reduces phase slippage between the fields and the charged particles and, therefore, efficiently accelerates charged particle towards the outlet. Details of various embodiments are discussed below.

Figure 1:
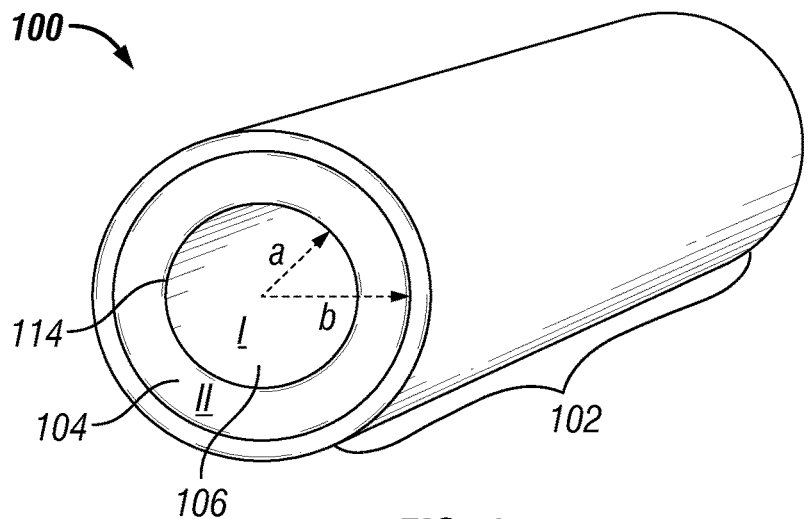
FIG. 1 shows a dielectric loaded accelerator in accordance with one embodiment of the present disclosure.
Figure 2:
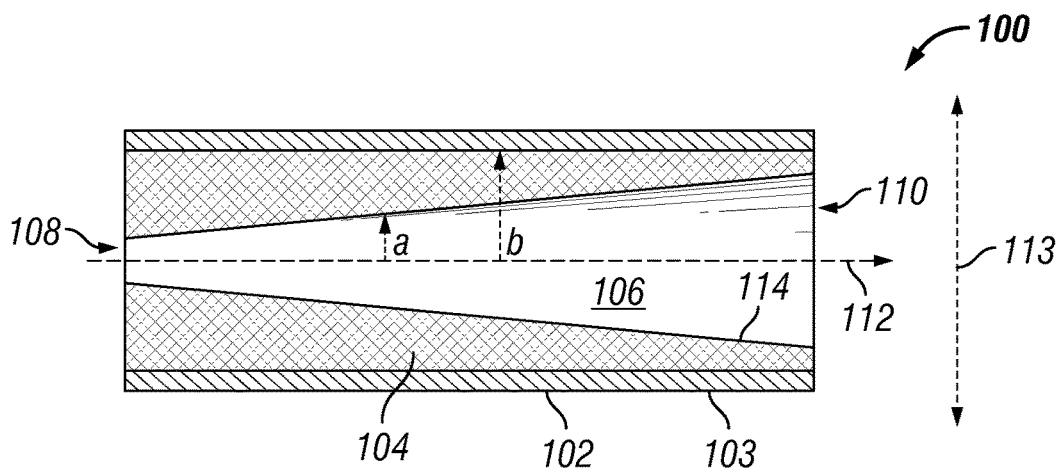
FIG. 2 shows another view of the dielectric loaded accelerator of FIG. 1.

A dielectric loaded accelerator (DLA) is a type of linear particle accelerator (LINAC) that uses a dielectric material lining along inner walls of a hollow waveguide. The presence of the dielectric material slows down the phase velocity of the oscillating electromagnetic fields within the accelerator so that charged particles can be accelerated along the length of the accelerator. FIGS. 1 and 2 show a dielectric loaded accelerator 100 for accelerating charged particles in accordance with one embodiment of the present disclosure. The dielectric loaded accelerator 100 includes an elongated body 102, such as a cylindrical or rectangular tube, that is made from a conductive material, such as a metal. The elongated body 102 confines electromagnetic fields within the body. The elongated body 102 is also referred to as a "waveguide." An interior portion of the elongated body 102 is lined (or coated) with a dielectric material 104. The dielectric material 104 defines a cavity having an inner volume 106 through which charged particles travel (e.g., electrons, ions, and protons). The accelerator 100 and the inner volume 106 include an inlet 108, an outlet 110 and a longitudinal axis 112 along which the charged particles are accelerated. The inner volume 106 of the accelerator is in an evacuated or low pressure state (e.g., a vacuum exists in the cavity).

The dielectric loaded accelerator 100 is powered by an input microwave signal that generates oscillating electromagnetic fields according to an electromagnetic mode. The electromagnetic mode includes a resonant frequency and a phase velocity. In the case of a dielectric loaded accelerator, the dielectric material is used to slow the phase velocity of the mode so that the phase velocity better matches the velocity of the charged particles being accelerated within the inner volume.

The dielectric loaded accelerators described herein include an electromagnetic mode with a phase velocity that increases towards the outlet of the accelerator and matches a velocity of the charged particles being accelerated along the longitudinal axis. The phase velocity of the accelerator increases to better match the velocity of the particles as the particles are accelerated along the longitudinal axis of the accelerator. In some embodiments, the phase velocity of the electromagnetic mode matches the velocity of the charged particles at a plurality of positions along the longitudinal axis (e.g., 3, 5, 10, 20 or 100 positions). In other embodiments, the phase velocity of the electromagnetic mode continuously matches the velocity of the charged particles accelerated along the longitudinal axis. By matching the phase velocity, the accelerator reduces phase slippage and more efficiently transfers energy from the oscillating electromagnetic fields to the charged particles. The phase velocity of the electromagnetic mode can be varied along the longitudinal axis of the dielectric loaded accelerator by varying the dielectric material along the longitudinal axis of the accelerator. In illustrative embodiment, the phase velocity is varied by varying at least one of the following parameters: (i) the outer radius of the dielectric material, (ii) the inner radius of the dielectric material, or (iii) the dielectric permittivity of the dielectric material. These parameters can be varied alone or in combination.

FIG. 2 shows a dielectric loaded accelerator 100 with an inner radius that is varied to increase the phase velocity along the longitudinal axis 112 of the accelerator. As shown, the dielectric material 104 of the accelerator 100 includes an inner radius (a), an outer radius (b), and a dielectric permittivity (∈). The varying phase velocity is achieved by varying the inner radius of the dielectric material 104 (while maintaining the outer radius (b) constant) so that the thickness of the dielectric material decreases along the longitudinal axis 112 of the accelerator and towards the outlet 110 of the accelerator. The decreasing thickness of the dielectric material 104 increases the phase velocity along the longitudinal axis 112 of the accelerator. The phase velocity of the electromagnetic mode of the accelerator 100 will be greater at the outlet 110 of the accelerator as compared to the inlet 108. In contrast, conventional dielectric loaded accelerators include a constant thickness that produced a constant phase velocity along the longitudinal axis of the accelerator. The constant phase velocity produces phase slippage and inefficient transfer of energy from the electromagnetic fields in the case of sub-relativistic particle beams.

By matching the phase velocity, the dielectric loaded accelerators described herein can accelerate beams to sub-relativistic velocities. A charged particle beam travels at sub-relativistic velocities when the particle beam energy is equal to or less than the particle rest mass. For electrons that have a rest mass of 0.511 MeV, beam energies of 1 MeV or less are considered sub-relativistic.

Also, the use of a dielectric material 104 within the elongated body 102 significantly reduces the transverse dimension 113 of the accelerator, as compared to conventional resonant cavity LINACs. The transverse dimension 113 of the dielectric loaded accelerator 100 is inversely proportional to a dielectric constant of the dielectric material 104. The smaller transverse dimension is particularly beneficial for oilfield wellbore applications, where available space is scarce.

Figure 3:
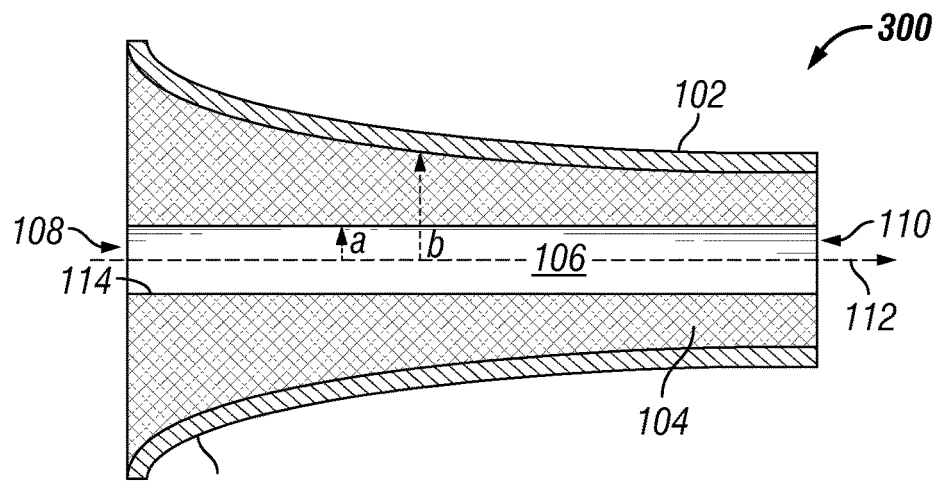
FIG. 3 shows a dielectric loaded accelerator with a decreasing outer radius in accordance with one embodiment of the present disclosure.

FIG. 3 shows a dielectric loaded accelerator 300 with an outer radius (b) that is varied to increase the phase velocity along the longitudinal axis 112 of the accelerator. The increase in phase velocity is achieved by decreasing the outer radius of the dielectric material 104 so that the thickness of the dielectric material decreases along the longitudinal axis 112 of the accelerator and towards the outlet 110 of the accelerator.

Figure 4:
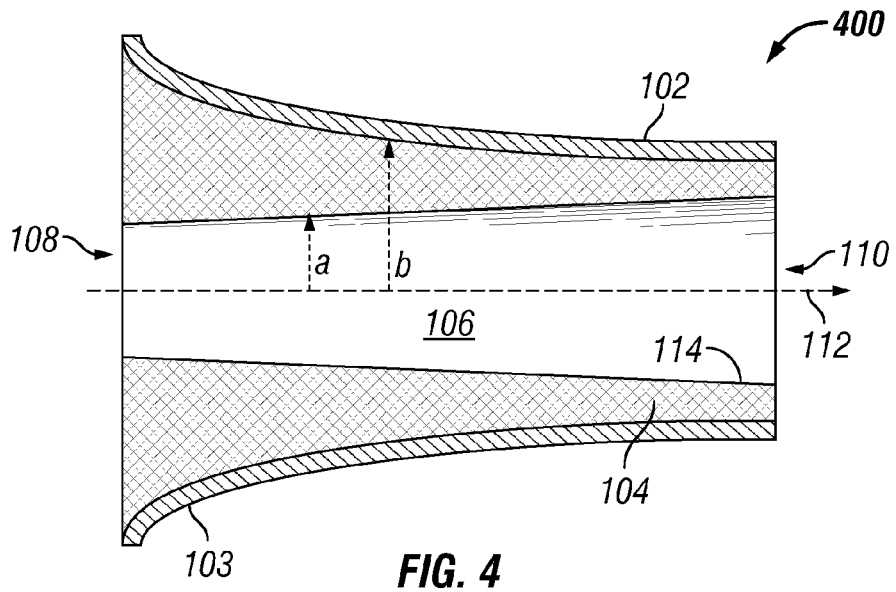
FIG. 4 shows a dielectric loaded accelerator with a decreasing outer radius and an increasing inner radius in accordance with one embodiment of the present disclosure.

FIG. 4 shows a dielectric loaded accelerator 400 with an outer radius (b) and an inner radius (a) that are varied to increase the phase velocity along the longitudinal axis 112 of the accelerator. In FIG. 4, the outer radius of the dielectric material 104 decreases along the longitudinal axis 112, while the inner radius increases. Together, the dimensions produce a dielectric material with a decreasing thickness that, in turn, increases the phase velocity of the electromagnetic mode of the accelerator 400 along the longitudinal axis 112.

Figure 5A:
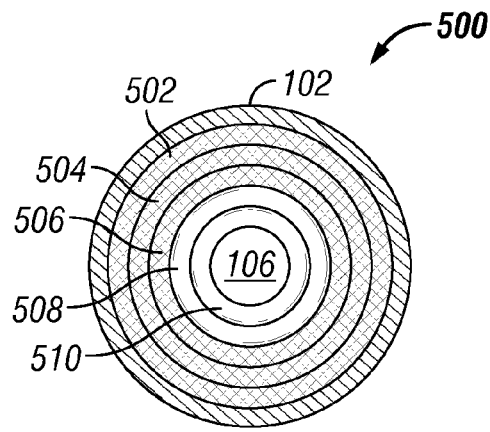
FIG. 5A shows a dielectric loaded accelerator with a plurality of layers in accordance with one embodiment of the present disclosure.
Figure 5B:
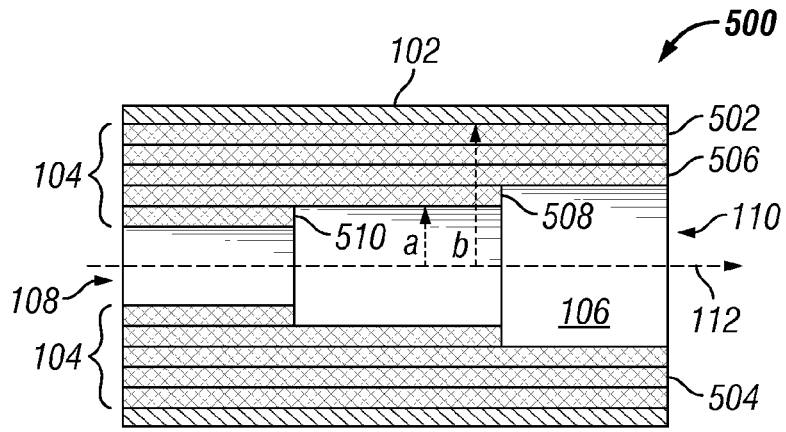
FIG. 5B shows another view of the dielectric loaded accelerator of FIG. 5A.

FIGS. 5A and 5B show a dielectric loaded accelerator 500 with a plurality of layers 502, 504, 506, 508, 510. The outer radius (b) and the inner radius (a) of the dielectric material 104 along the longitudinal axis 112 can be selected by using the plurality of layers 502, 504, 506, 508, 510. The layers 502, 504, 506, 508, 510 are deposited concentrically within the conductive elongated body 102 of the accelerator 500. Thus, for a cylindrical elongated body 502, the layers 502, 504, 506, 508, 510 form concentric cylinders within the body. The thickness of the dielectric material 104 can be decreased by decreasing the number of layers in portions of the accelerator and increased by applying additional layers in portions of the accelerator or by applying thinner or thicker layer, respectively. In FIGS. 5A and 5B, the inner radius (a) of the dielectric material 104 along the longitudinal axis 112 is increased by not extending inner layers 510 and 508 to the outlet 110 of the accelerator.

Figure 6:
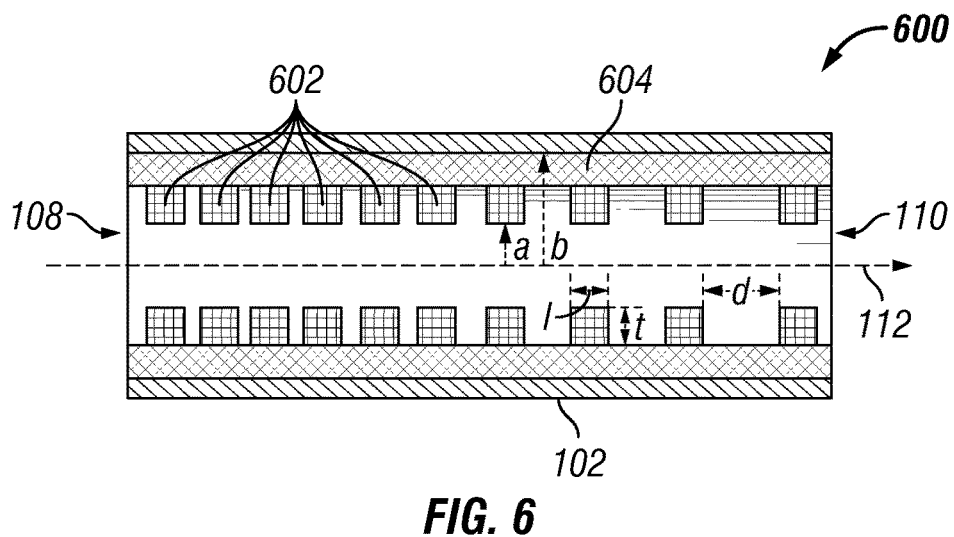
FIG. 6 shows a dielectric loaded accelerator with a plurality of dielectric elements in accordance with one embodiment of the present disclosure.
Figure 7:
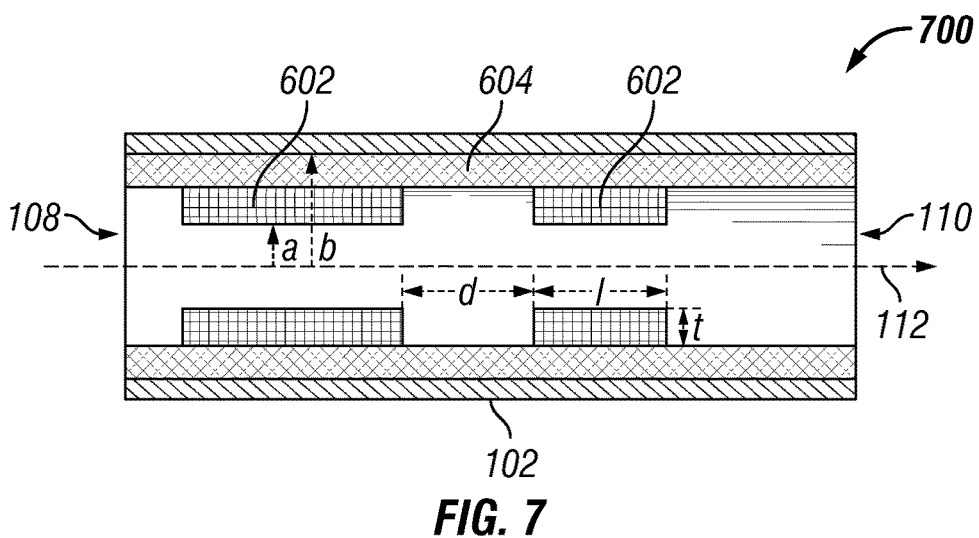
FIG. 7 shows a dielectric loaded accelerator with a plurality of dielectric elements in accordance with another embodiment of the present disclosure.

The increasing phase velocity can be achieved without continuously varying the outer radius (b) and/or the inner radius (a) of the dielectric material along the longitudinal axis of the accelerator. For example, in some embodiments, the increase in phase velocity is achieved by disposing a plurality of dielectric elements along the longitudinal axis of the accelerator. FIG. 6 shows a dielectric loaded accelerator 600 with a plurality of dielectric elements 602 disposed on a base dielectric material 604. In a cylindrical embodiment, such as the one shown in FIG. 1, the elements 602 may be concentric rings disposed along the longitudinal axis 112 of the accelerator 600. The thickness (t), the length (l), and/or the separation distances between the elements 602 (d) can be varied to increase the phase velocity along the longitudinal axis 112. For example, in this case, the thickness and the length of the dielectric elements 602 remain constant, while the separation distance between the elements increases along the longitudinal axis. This increase in separation distance generates an electromagnetic mode with increasing phase velocity. In another example, FIG. 7 shows a dielectric loaded accelerator 700 with a plurality of dielectric elements 602 where the thickness (t) of the elements is constant, while the length (l) of the elements decreases moving along the longitudinal axis.

Figure 8:
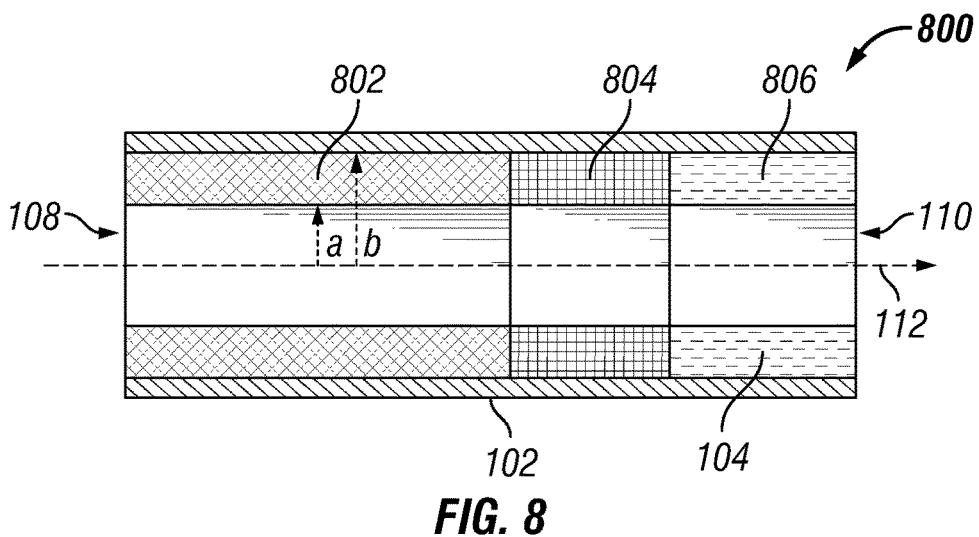
FIG. 8 shows a dielectric loaded accelerator with an increasing dielectric permittivity in accordance with one embodiment of the present disclosure.

FIG. 8 shows a dielectric loaded accelerator 800 with sections of different dielectric permittivity disposed along the longitudinal axis 112 of the accelerator. An increasing phase velocity can also be achieved by varying the dielectric permittivity ($\in$) of the dielectric material 104 along the longitudinal axis 112 of the accelerator 800. In particular, the dielectric permittivity of the dielectric material 104 is decreased along the longitudinal axis 112 of the accelerator 800 and towards the outlet 110 of the accelerator to produce an increasing phase velocity. In some embodiments, the dielectric material 104 includes a plurality of sections 802, 804, 806 disposed along the longitudinal axis 112. Each section includes a dielectric material with a different dielectric permittivity. The sections 802, 804, 806 are arranged so that the dielectric permittivity decreases towards the outlet 112 of the accelerator. In FIG. 8, the section 802 with the largest dielectric permittivity is disposed nearest to the inlet 108, while the section 806 with the smallest dielectric permittivity is disposed nearest to the outlet 110. In further embodiments, the dielectric material 104 includes a section with a composite dielectric material with a graded permittivity profile along its length.

Figure 9:
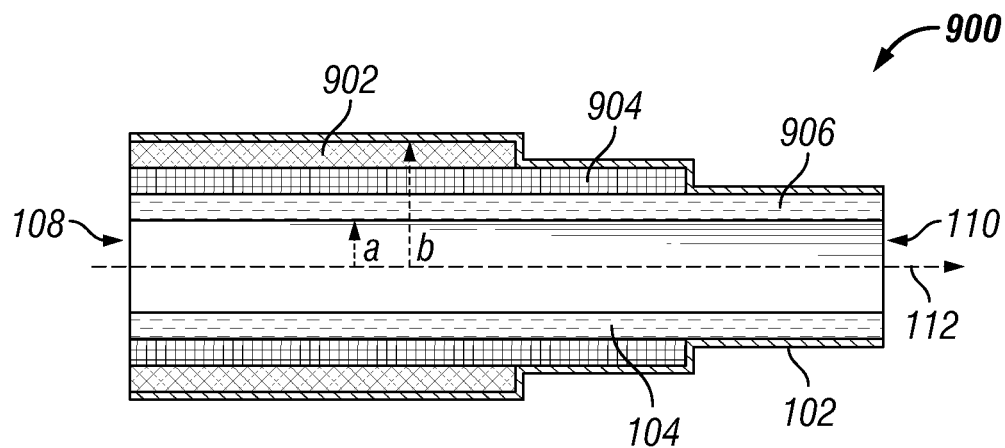
FIG. 9 shows a dielectric loaded accelerator with a varying thickness and dielectric permittivity in accordance with one embodiment of the present disclosure.

FIG. 9 shows a dielectric loaded accelerator 900 with a thickness and a dielectric permittivity ($\in$) that varies along the longitudinal axis 112 of the accelerator. In such embodiments, a dielectric material 104 with a plurality of layers 902, 904, 906 can be used to vary both thickness and dielectric permittivity. In FIG. 9, the thickness and the dielectric permittivity of the dielectric material 104 decrease towards the outlet 110 of the accelerator 900. The thickness of the dielectric material 104 along the longitudinal axis 112 is decreased by not extending certain outer layers 902, 904 to the outlet 110 of the accelerator 900. Also, each layer 902, 904, 906 includes a material with a different dielectric permittivity.

Figure 10:
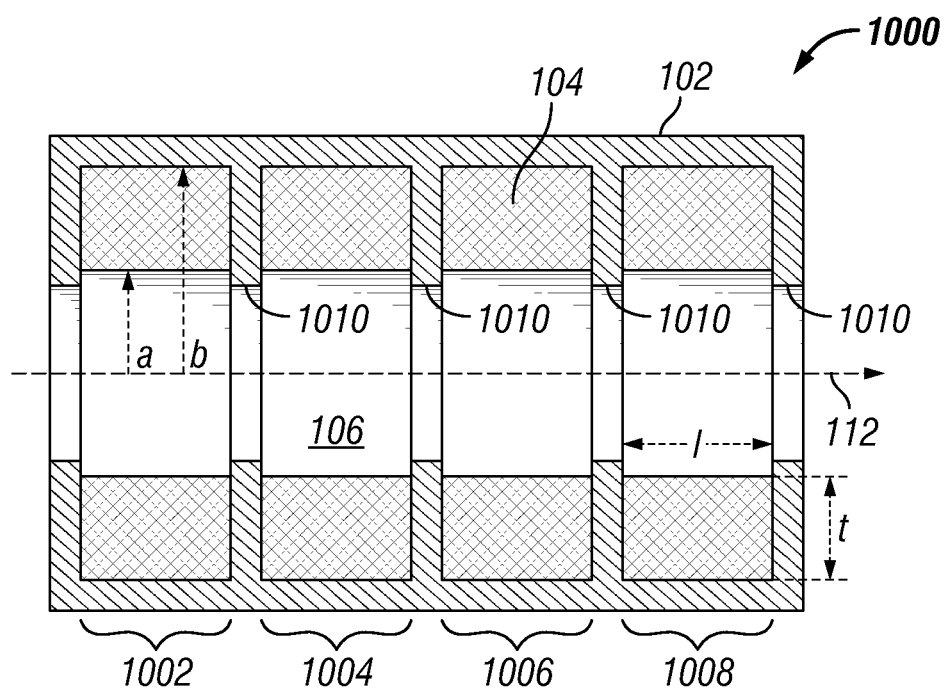
FIG. 10 shows an example of a dielectric loaded accelerator with a plurality of dielectric sections in accordance with one embodiment of the present disclosure.

FIG. 10 shows a dielectric loaded accelerator 1000 with a plurality of dielectric sections 1002, 1004, 1006, 1008 disposed along the longitudinal axis 112 of the accelerator and separated by metal elements 1010, such as metal disks or irises. In such an embodiment, the increasing phase velocity can be achieved by (i) decreasing the thickness (t) of each section 1002, 1004, 1006, 1008 along the longitudinal axis 112 of the accelerator 1000 or (ii) decreasing the dielectric permittivity ($\in$) of the dielectric material 104 in each section along the longitudinal axis of the accelerator (e.g., in a similar manner to the embodiment disclosed in FIG. 8). These approaches can be used, alone or in combination, to increase the phase velocity of the electromagnetic mode of the accelerator. In the embodiment of FIG. 10, the metal elements 1010 extend into the inner volume 106 of the accelerator. In other embodiments, the dielectric material 104 extends further into the inner volume 106 than the metal elements 1010. Such metal elements can be used to enhance the oscillating electromagnetic field within the accelerator. The metal elements 1010 may be particularly beneficial because the elements have a high reflection coefficient that results in an enhanced electric field and acceleration gradient.

Figure 11A:
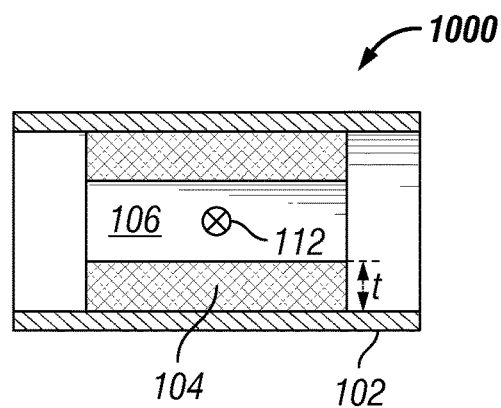
FIG. 11A shows a dielectric loaded accelerator with planar configuration in accordance with one embodiment of the present disclosure.
Figure 11B:
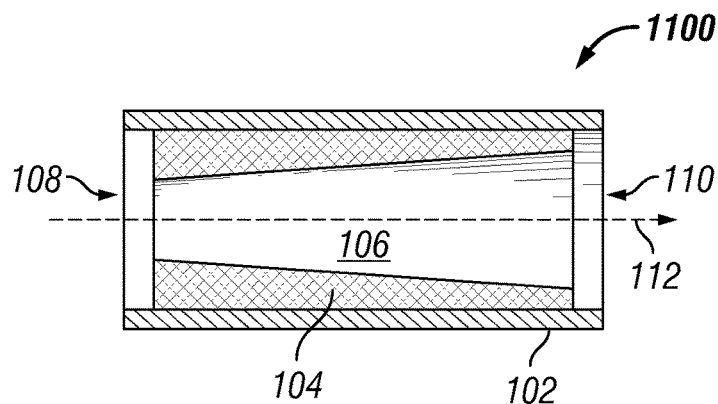
FIG. 11B shows another view of the dielectric loaded accelerator of FIG. 11A.

The dielectric loaded accelerator described herein is not limited to any particular type of geometry. For example, the dielectric loaded accelerator may have an elongated body with cylindrical or rectangular geometry. Furthermore, the accelerator may also have a planar configuration that includes two parallel dielectric elements supported by metal plates. FIGS. 11A and 11B show an example of a dielectric loaded accelerator 1100 with a planar configuration. In FIG. 11B, the thickness (t) of the dielectric material 104 decreases along the longitudinal axis 112 of the accelerator 1100 so that the phase velocity of the electromagnetic mode matches the velocity of the charged particles accelerated along the longitudinal axis.

The dielectric loaded accelerator described herein can be fabricated using various different techniques. The dielectric loaded accelerator can be fabricated using a bulk dielectric material by machining the bulk dielectric material to have an appropriate inner radius and outer radius. Additionally or alternatively, deposition techniques can also be used to fabricate the dielectric loaded accelerator. For example, sputtering, thin-film, thick-film, lithographic, and sintering techniques can be used to deposit (i) multiple dielectric layers within the conductive elongated body or (ii) a metal layer or dielectric layers on an outer surface of the dielectric bulk material. In further examples, direct or additive manufacturing techniques, such as thermal spray, cold spray, direct printing, screen printing, and cold or hot aerosol deposition are used to deposit the plurality of layers. Deposition fabrication techniques are more flexible than conventional techniques that fabricate the dielectric material from a hard ceramic bulk material. For example, functional elements and layers, as will be further described below, can be imbedded within the dielectric material using the deposition techniques. In some embodiments, one or more sacrificial layers can be used. Such deposition fabrication techniques can also be used to deposit various materials with high permittivity values (e.g., titanium dioxide) for which layer thickness would otherwise be too thin for conventional bulk fabrication techniques.

Figure 12:
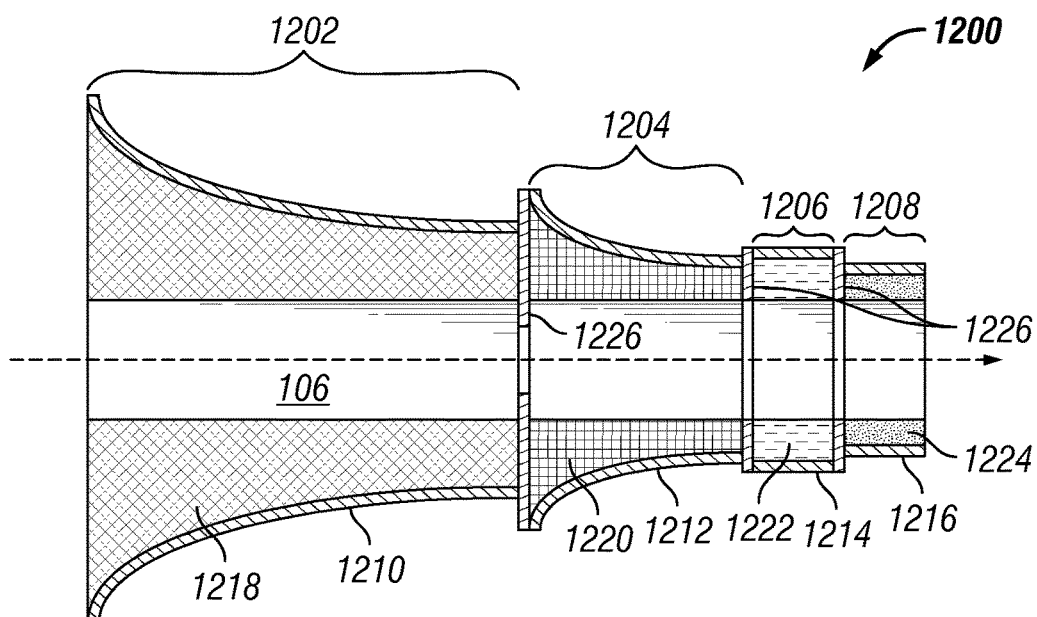
FIG. 12 shows a dielectric loaded accelerator formed from a plurality of sections in accordance with one embodiment of the present disclosure.

The dielectric loaded accelerator can also be assembled from a plurality of sections that are joined together along a longitudinal axis. FIG. 12 shows a dielectric loaded accelerator 1200 that includes a plurality of sections 1202, 1204, 1206, 1208. Each section includes an elongated body 1210, 1212, 1214, 1216 with a dielectric material 1218, 1220, 1222, 1224 and each section is joined to one or two other adjacent sections. Each section may have a dielectric material with a different thickness and/or dielectric permittivity. In FIG. 12, the sections 1202, 1204, 1206, 1208 are joined via metal elements 1226, such as metal disks or irises, by bonding the elongated body of each section to the metal elements.

The dielectric material within the accelerator can be formed from various different materials, such as silicon, oxides (e.g., aluminum oxide), and various titanate (e.g., TiOx) or tantalate (e.g., TaOx) based ceramics. In some embodiments, the dielectric loaded accelerator includes a dielectric material with a high value of dielectric permittivity (e.g. Re($\in$) is greater than 20) to increase the shunt impedance of the accelerator and, thus, increase acceleration efficiency. The increased efficiency of materials with higher permittivity values should be weighed against the electromagnetic power losses in these materials. Electromagnetic power losses are determined by the imaginary part of dielectric permittivity (Im($\in$)). Electromagnetic power losses tend to be high for dielectric materials with high values of permittivity (Re($\in$)). The loss properties of the dielectric materials can be described in terms of the dielectric loss tangent (tan($\delta$)), which is the ratio of Im($\in$) over Re($\in$). Dielectric loss also tends to increase with frequency for many dielectric materials, such as single crystals and polycrystalline ceramics. In various embodiments, the dielectric loaded accelerator includes a dielectric material with a high value of dielectric permittivity and also a low value of dielectric loss. A low value of dielectric loss prevents the input microwave power from being dissipated in the dielectric material. A dielectric material with a low dielectric loss will efficiently maximize the accelerating electric field inside the material. Table 1 below provides a non-limiting list of materials that can be used alone or in combination to form the dielectric material. Table 1 provides a name, a dielectric permittivity ($\in$), and a dielectric loss tangent (tan($\delta$)) for each material at a particular frequency (f) and at room temperature.

TABLE 1

| Material | $\in$ | tan($\delta$) | f (GHz) |
| --- | --- | --- | --- |
| Aluminum Oxide (Al2O3) | 9.8 | 1.70E−05 | 17 |
| Magnesium/Calcium Titanate (Mg/Ca—TiO3) | 22.1 | 1.20E−05 | 10 |
| Barium Magnesium Tantalate (BMT) | 24.5 | 3.00E−05 | 10 |
| Barium Niobium Oxide (BNO) | 35.6 | 2.80E−05 | 10 |
| Titanium Dioxide TiO2 | ~100 | ~2E−4 | 10 |
| Silicon (Si) (High Resistivity) | 11.5 | 3.00E−06 | 140 |
| Diamond | 5.66 | 6.00E−06 | 140 |

The dielectric loaded accelerators described herein can have a variety of different geometries and operating parameters. Table 2 below shows ranges for various dimensions and operating parameters of the accelerator. These ranges are provided as examples and the embodiments described herein are not limited to such ranges.

TABLE 2

| Parameter | Range |
| --- | --- |
| Accelerator Geometry | — |
| Outer Radius (b) at Inlet | 3 to 30 mm |
| Outer Radius (b) at Outlet | 2 to 20 mm |
| Inner Radius (a) at Inlet | 1 to 10 mm |
| Inner Radius (a) at Outlet | 1 to 10 mm |
| Dielectric Permittivity ($\in$) | 5 to 100 |
| Length from Inlet to Outlet | 50 to 500 mm |
| Electromagnetic Mode Parameters | — |
| Resonant Frequency | 1 to 100 GHz |
| Wavelength | 0.3 mm to 30 cm |
| Phase Velocity at Inlet | 0 to 100% of c |
| Phase Velocity at Outlet | 0.5 to 100% of c |
| Beam Parameters | — |
| Beam Energy at Inlet | 0 to 0.1 MeV |
| Beam Energy at Outlet | 0.1 to 10 MeV |

In Table 2, the oscillating electromagnetic field within the dielectric loaded accelerator has a frequency between 1 and 100 GHz and the dielectric permittivity of the dielectric material within the accelerator has a value between 5 and 100. Such a dielectric permittivity is typical for high-purity and low-loss ceramics materials and other dielectrics. Given such operating parameters, the oscillating electromagnetic field within the dielectric loaded accelerator will have a wavelength ($\lambda$) between 0.03 mm and 30 cm.

The geometry and dielectric permittivity of the dielectric loaded accelerator can be selected to support a particular electromagnetic mode. For example, in one embodiment, the dielectric loaded accelerator is configured to operate using an azimuthally symmetric mode, such as a TM01 mode. To support this mode, the accelerator has a cylindrical geometry. Other types of electromagnetic modes can also be used, such as higher order TMmn modes. Also, more complex accelerator designs that include, for example, non-cylindrical designs may use hybrid electromagnetic modes with an electric field dominantly oriented along the longitudinal direction.

The dielectric loaded accelerator can operate in a standing wave mode or a travelling wave mode. In a traveling wave mode, the oscillating electromagnetic fields travel through the accelerator with a group velocity, while, in a standing wave mode, the group velocity is zero. For a given end-point energy and power input, the overall length required for a standing wave mode accelerator may be shorter than a traveling wave mode accelerator because standing wave accelerators can produce stronger electromagnetic fields. On the other hand, a traveling wave accelerator has a broader frequency bandwidth, which is advantageous when operating over an extended temperature range.

In particular, the geometry and dielectric permittivity of the dielectric loaded accelerator are selected to support an electromagnetic mode with a phase velocity that matches a velocity of the charged particles accelerated along the longitudinal axis of the accelerator. Equations 1 through 4 below can be used to determine the phase velocity ($v_p$) for a dielectric loaded accelerator with a cylindrical configuration, such as the one shown in FIG. 1, using a TM01 electromagnetic mode. In the equations below, the z direction corresponds to the longitudinal axis of the accelerator, b is the outer radius of the dielectric material, and a is the inner radius of the dielectric material. The accelerator can be defined by two regions, as shown in FIG. 1. Region I, for 0<r<a, is the inner volume that contains a vacuum and region II, for a<r<b, is the dielectric material with a dielectric permittivity ($\in$). The amplitude of the electric field in the z direction ($E_r$) of the electromagnetic field within the accelerator can be described according to the following relationship:

$$E_z = \begin{cases} A[J_0(\kappa_1 r)]e^{j(\omega t - \beta z)} & 0 \leq r < a \\ B\left[J_0(\kappa_2 r) - \frac{J_0(\kappa_2 b)}{Y_0(\kappa_2 b)} Y_0(\kappa_2 r)\right]e^{j(\omega t - \beta z)}, & a \leq r < b \end{cases} \quad (1)$$

where $\omega$ is the angular frequency of the electromagnetic mode, $\beta$ the electromagnetic mode propagation constant, and $\kappa_1$, $\kappa_2$ are the cutoff wave numbers in region I and II, as defined above, respectively. A and B are constants representing the electromagnetic field amplitude in region I and II, while $J_0$ and $Y_0$ are Bessel functions expressing the field radial dependence. Equation 1 (and analogous equations for the other non-zero field components, such as the radial component of the electric field ($E_r$) and the azimuthal component of the magnetic field ($H_\phi$) use s plane wave expansion formalism, which is known in the art.

The phase velocity ($v_p$) of the electromagnetic field can be determined from the angular frequency ($\omega$), the propagation constant ($\beta$), and according to the following relationship:

$$v_p = \omega/\beta \quad (2)$$

In turn, the propagation constant ($\beta$) can be determined from the following relationships:

$$\beta^2 = \frac{\omega^2}{c^2} - \kappa_1^2 = \varepsilon \frac{\omega^2}{c^2} - \kappa_2^2, \quad (3)$$

which exists between $\beta$ and the cut-off wavenumbers in regions I and II and the following dispersion relation for the TM01 mode:

$$\kappa_2 J_0'(\kappa_1 a)\left[J_0(\kappa_2 a) - \frac{J_0(\kappa_2 b)}{Y_0(\kappa_2 b)} Y_0(\kappa_2 a)\right] = \quad (4)$$
$$\varepsilon \kappa_1 J_0(\kappa_1 a)\left[J_0'(\kappa_2 a) - \frac{J_0(\kappa_2 b)}{Y_0(\kappa_2 b)} Y_0'(\kappa_2 a)\right].$$

The dispersion relationship in equation 4 above uniquely determines the dependence of the propagation constant ($\beta$) on the angular frequency ($\omega$), as a function of the geometrical and material parameters a, b, and $\in$. A similar relationship exists for more complex boundary conditions, such as when the accelerator has multiple dielectric boundaries (e.g., a dielectric material with a plurality of layers) or when the accelerator is operated using an electromagnetic mode different from the TM01 mode.

Equation 1 through 4 can be used to configure a dielectric loaded accelerator so that the accelerator's electromagnetic mode has a particular phase velocity ($v_p$) at a plurality of positions along the longitudinal axis (z) for a given angular frequency ($\omega$). Since the cutoff wave numbers in region I and II ($\kappa_1$ and $\kappa_2$) are themselves functions of the angular frequency ($\omega$) and the propagation constant ($\beta$), specifying phase velocity as a function of position $v_p(z)$ is equivalent to specifying $\kappa_1$ and $\kappa_2$ as a function of position along the accelerator (e.g., $\kappa_1$ (z) and $\kappa_2$ (z)).

A particular phase velocity ($v_p$) at each position along the longitudinal axis (z) of the dielectric loaded accelerator can be set by varying the following parameters:

(i) the outer radius of the dielectric material (b),
(ii) the inner radius of the dielectric material (a), or
(iii) the dielectric permittivity of the dielectric material ($\in$).

Any of these parameters, alone or in combination, can be used to modulate phase velocity as a function of position within the dielectric loaded accelerator for a given electromagnetic mode and at a desired frequency. In one embodiment, the inner radius and the dielectric permittivity of the dielectric loaded accelerator are maintained as constant, as in FIG. 3, and equation 4 is solved for an outer radius (e.g., b=b(z)). In another embodiment, the outer radius and dielectric permittivity are maintained as constant, as in FIG. 2, and equation 4 is solved for an inner radius (e.g., a=a(z)). In a further embodiment, the inner radius and outer radius are maintained as constant, as in FIG. 8, and equation 4 is solved for a dielectric permittivity (e.g., $\in=\in(z)$).

As explained above, the parameters should be selected so that the phase velocity of the electromagnetic mode matches the particle velocity along the longitudinal axis of the accelerator at a plurality of positions. In one specific example, for a dielectric loaded accelerator with a dielectric permittivity ($\in$) of 20, an inner radius (a) of 2 mm, and a travelling wave TM01 electromagnetic mode, the outer radius (b) should be 3.705 mm to match the phase velocity of a 200 keV electron beam (beam velocity=$v_p$=0.695c). For an electron beam of 500 keV (beam velocity=0.863c), however, the outer radius (b) should change to 3.65 mm. The physical distance along the longitudinal axis over which the outer diameter (b) varies from 3.705 mm to 3.65 mm will depend on the distance required to accelerate the beam from 200 to 500 keV, which, in turn will depend on the input microwave signal.

In illustrative embodiments, the characteristics of the dielectric loaded accelerator (e.g., inner radius (a), outer radius (b), and/or dielectric permittivity (∈)) change continuously over the length of the accelerator. In other embodiments, the characteristics of the dielectric loaded accelerator change in increments that are defined by an increment distance along the length of the accelerator. In some embodiments, the wavelength of the oscillating electromagnetic field within the accelerator sets the increment distance along the length of the accelerator. To efficiently accelerate charged particles along the length of the accelerator, the increment distance is less than the wavelength. For example, at a frequency 10 GHz and a dielectric permittivity of 20, the wavelength of the electromagnetic field within the dielectric material is approximately 6.7 mm. Thus, for such an accelerator, the increment distance will be a fraction of this wavelength.

Various embodiments of the present disclosure are also directed to accelerator configurations that confine electromagnetic fields of a particular frequency within the inner volume of the accelerator while minimizing dielectric losses. As explained above, the dielectric loaded accelerator can include a dielectric material with a plurality of layers, such as the dielectric loaded accelerator shown in FIGS. 5A and 5B. Each layer can have a different thickness and/or different dielectric permittivity value. The thickness and permittivity values for each layer can be set to form a "Bragg mirror" (also known as a "dielectric mirror"). The Brag mirror can be used to reflect electromagnetic waves of a particular frequency. A "radial Bragg mirror" structure can be formed by applying a plurality of layers concentrically within the elongated body of the accelerator. The radial Bragg mirror can be used to confine electromagnetic waves of a particular frequency within the inner volume of the accelerator. In so doing, the accelerator can decrease power loss and can more efficiently accelerate the particle beam. For a dielectric loaded accelerator with a plurality of layers, the radius values (a) and (b) of each layer are determined by the dielectric permittivity of each layer. As described above, these parameters are chosen so that the phase velocity of the electromagnetic mode matches the particle beam velocity (e.g., synchronicity requirement). Also, for a dielectric loaded accelerator with a plurality of layers, the layers of varying permittivity are surrounded by an elongated metallic body (102) and a dispersion relationship, similar to the one discussed with respect to equation 4, will apply. Further details regarding Bragg mirrors can be found in, for example, Yeh et al., "Theory of Bragg Fiber," J. Opt. Soc. Am., Vol. 68, No. 9, pp. 1196-1201 (1978).

Various embodiments of the present disclosure are also directed to accelerator configurations that prevent or minimize charge accumulation on surfaces of the dielectric material. As a charged particle beam traverses the inner volume of the dielectric loaded accelerator, charged particles from the beam may scatter and be absorbed at a surface and in the bulk of the dielectric material. Since the dielectric material is an insulating structure, any charged particles trapped within the material cannot easily be dissipated. Most of these charged particles will penetrate only a small distance into the dielectric material (e.g., a few micrometers) given the nearly collinear geometry between the particle beam and an inner surface (114) of the accelerator. Also, depending on the properties of the dielectric material, secondary electron emission and electron backscattering may take place. The net result is that the surface of the dielectric material can accumulate charge to form an electric field that can negatively affect the transmission or stability of the charged particle beam. The embodiments described below can be used alone or in combination to prevent or minimize charge accumulation on surfaces of the dielectric material.

In a first embodiment, the dielectric loaded accelerator uses a conductive layer at an inner surface (114) of the accelerator to minimize charge accumulation at the inner surface and to prevent interference from any resulting electric fields. The thin conductive layer includes a conductive material, such as titanium nitride (TiN), titanium aluminum nitride (TiAlN), or a carbon based coating, such as a diamond-like carbon (DLC) or a carbon nitride coating. The thickness of the layer is sufficient to prevent or minimize charge accumulation at the inner surface of the accelerator by electrically conducting the charged particles away from the inner surface. To this end, the conductive layer may be grounded to, for example, an electrical sink. A grounded conductive layer may also function as a Faraday cage and shield the beam from any electric field that results from more deeply trapped charges. The conductive layer (e.g., an ungrounded conductive layer) may also function to homogenize or redistribute the surface charge on the inner surface of the accelerator. In some cases, the layer may distribute charge so that the electric field produced by the charge becomes cylindrically symmetric and thus has a positive radially-focusing effect on the beam. The thickness of the layer is thinner than the skin depth of the dielectric material to provide for microwave penetration with minimal power dissipation and so as not to destroy the boundary conditions and the performance of the accelerator. Skin depth is frequency dependent and material dependent. For example, in the case of a titanium nitride layer with a conductivity of approximately 1E6 S/m, the skin depth at 10 GHz is approximately 5 µm, whereas for a metal with a good conductance (e.g., 1E8 S/m) at the same frequency, the skin depth would be approximately 0.5 µm. The thin conductive layer can be applied to the inner surface using a number of different techniques, such as atomic layer deposition or magnetron sputtering. In some embodiments, a voltage bias is applied between the thin conductive layer and, for example, an outer wall (103) of the conductive elongated body (102) of the accelerator. The voltage bias can be DC or AC. The voltage bias drives electrons away from the inner surface of the accelerator and towards the conductive outer portion of the conductive elongated body, which may be set to ground. In another embodiment, the conductive elongated body is segmented into sections and a voltage bias is applied between the sections to pull trapped electrons away from the inner surface of the accelerator. Accordingly, in some embodiments, the dielectric material has low electrical conductivity at low frequencies to allow charge migration through the material, while maintaining a relatively large permittivity value with low dielectric loss at high frequencies.

In a second embodiment, the dielectric loaded accelerator includes one or more conductive elements embedded within the dielectric material to prevent or minimize charge accumulation on or within the dielectric material of the accelerator. The conductive elements may be a metal wire, a metal grid structure or a metal layer. The conductive elements are set to ground to collect electrons that accumulate within the dielectric material. In some embodiments, the conductive elements are embedded between dielectric layers within the dielectric material. For example, in FIGS. 5A and 5B, layer 504 may represent a metal layer, while the other layers are dielectric layers. In other embodiments, the conductive elements may be metal elements, such as the metal disks or irises 1010 shown in FIG. 10.

In a third embodiment, the dielectric loaded accelerator uses a dielectric material with a negative electron affinity to prevent or minimize charge accumulation at the inner surface (114) of the accelerator. A negative electron affinity allows any trapped electrons to be reabsorbed into a conduction band of the dielectric material. Hydrogen terminated diamond is one example of such a dielectric material. Other materials can also be used, such as materials with functionalized surfaces that facilitate electron reabsorption.

In a fourth embodiment, the dielectric loaded accelerator uses an external magnetic field, such as an axial field or alternating quadrupole field, along its longitudinal axis to magnetically focus the particle beam and thus decrease interactions with the inner surface of the accelerator.

Various embodiments of the present disclosure are also directed to accelerator configurations that maintain the electromagnetic mode of the accelerator and minimize its frequency under changing temperature conditions. Due to ambient conditions, resistive losses within the dielectric material, and/or ohmic losses on the outer wall (103), the temperature of the dielectric loaded accelerator may increase during operation. When the temperature increases, the dielectric material may expand or contract and its dielectric permittivity may change. This change in physical and electrical properties will cause a shift in the properties of the electromagnetic mode, such as resonant frequency and frequency-dependent dispersion. The embodiments described below can be used alone or in combination to maintain the frequency of the electromagnetic mode of the accelerator under changing temperature conditions, such as those that exist in oilfield wellbore applications.

In a first embodiment, the dielectric loaded accelerator includes a material with a tunable dielectric permittivity that can be used to prevent or minimize a shift in the electromagnetic mode of the accelerator under changing temperature conditions. The material can be disposed as a layer within the dielectric material. For example, in FIGS. 5A and 5B, layer 504 may represent a material with a tunable dielectric permittivity. Such materials may be responsive to electric fields, such as a ferro-electric material. When the electric field is applied to the ferro-electric material, its dielectric permittivity changes and the resonant frequency or the phase velocity of the electromagnetic mode can be adjusted. In some cases, the material is tuned as a function of temperature change. In another embodiment the dielectric loaded accelerator can also be tuned using nematic crystals, such as nematic crystals disposed within a liquid filled channel. In such an embodiment, the composition or the temperature of the liquid is altered to tune the resonant frequency or the phase velocity of the accelerator.

In a second embodiment, the dielectric loaded accelerator includes materials with different temperature coefficients that can be used to prevent or minimize a shift in the electromagnetic mode of the accelerator under changing temperature conditions. For example, a first dielectric layer may include a temperature coefficient that is opposite to the temperature coefficient of a second dielectric layer. When the temperature changes, the first dielectric layer compensates for the change in dielectric permittivity of the second dielectric layer. In particular, the dielectric permittivity of titanium dioxide has a temperature coefficient that is larger and opposite in sign to the temperature coefficients of many ceramics, such as alumina. Thus, a titanium dioxide layer with an appropriate thickness can be used to maintain the average dielectric permittivity of a composite dielectric material under changing temperature conditions.

In a third embodiment, the dielectric loaded accelerator includes materials that conduct thermal energy away to prevent or minimize a shift in the electromagnetic mode of the accelerator under changing temperature conditions. For example, some of the layers within the dielectric material may include high coefficients of thermal conductivity. These layers can be used to conduct thermal energy away from the dielectric material to a heat sink. In another example, cooling channels are embedded within the dielectric materials and coolant can be circulated through the channels to conduct thermal energy away from the dielectric material.

Functional elements, such as the tunable dielectric materials and the embedded conductive elements described above, can be incorporated into the dielectric material in a manner that will not adversely affect the performance of the dielectric loaded accelerator. Such functional elements may have high dielectric loss characteristics. Nonetheless, a dielectric loaded accelerator with a plurality of layers will have a complex radial field distribution. The complex radial field distribution will have regions with a strong radial field, where low dielectric loss is a valuable characteristic, and will have regions with weak radial fields, where low dielectric loss is a relatively unimportant characteristic. The functional elements can be incorporated into regions with weak radial fields so that their placement does not adversely affect the performance of the dielectric loaded accelerator.

Figure 13:
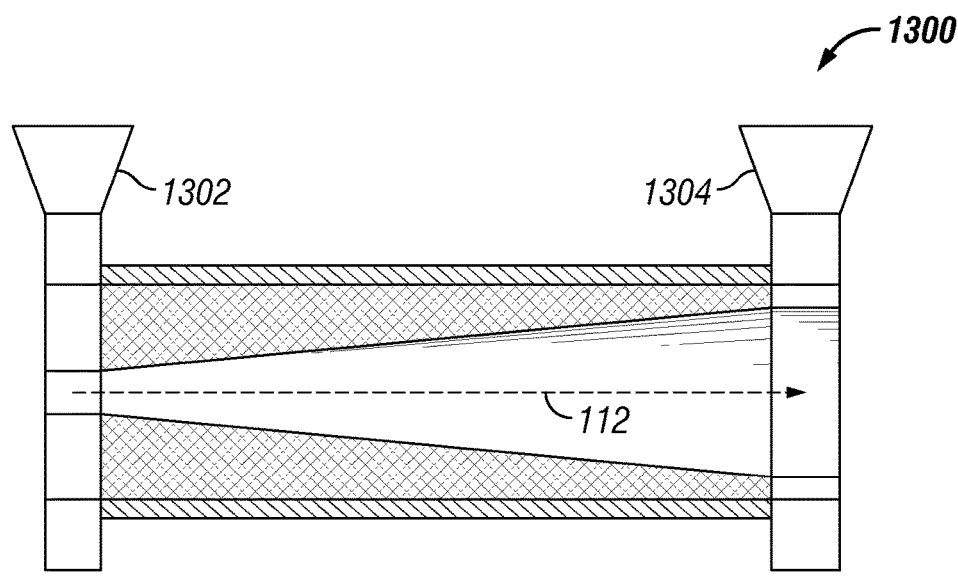
FIG. 13 shows a dielectric loaded accelerator that is a coupled to two waveguide couplers in accordance with one embodiment of the present disclosure.

Various embodiments of the present disclosure can use a number of different technologies to couple the dielectric loaded accelerator to an input microwave power source. For example, the accelerators described herein can use one or more waveguide couplers. FIG. 13 shows a dielectric loaded accelerator 1300 that is coupled to a first waveguide coupler 1302 and a second waveguide coupler 1304. The dielectric loaded accelerator 1300 is similar to the one shown in FIG. 2. In a travelling wave configuration, the first waveguide coupler 1302 provides input microwave power into the accelerator 1300 so that the microwaves travel through the accelerator along the longitudinal axis 112. In a travelling wave configuration, a fraction of the power of the microwaves is dissipated within the accelerator and the second waveguide coupler 1304 can be used to extract the remaining power from the accelerator. In some embodiment, the remaining power is sent to a matched load, while in other embodiment, the remaining power is returned to the accelerator through the first waveguide coupler 1302 (e.g., resulting in a travelling wave or ring resonator configuration). This disclosure is not limited to any particular type of waveguide coupler. In some embodiments, the waveguide coupler is a side coupler. A side coupler delivers the input power in a transverse direction through a coupling slot into a region of the dielectric loaded accelerator. In a further embodiment, the waveguide coupler is an axial coupler. An axial coupler delivers the input power parallel to the longitudinal axis of the accelerator. The waveguide couplers described above can be used with circular, rectangular or planar microwave waveguides. In more specific embodiments, the waveguide couplers use WR90 or WR112 waveguides operating in the X-band region. A waveguide coupler may also use one or more transition cells to optimize impedance matching between the microwave input power source and the dielectric loaded accelerator. Impedance matching can be achieved by optimizing the transition cell geometry, transition cell materials, and/or the position of tuners, such as rods, screws, and plates. Such transition cells are often called matching cells by those skilled in the art.

Figure 14:
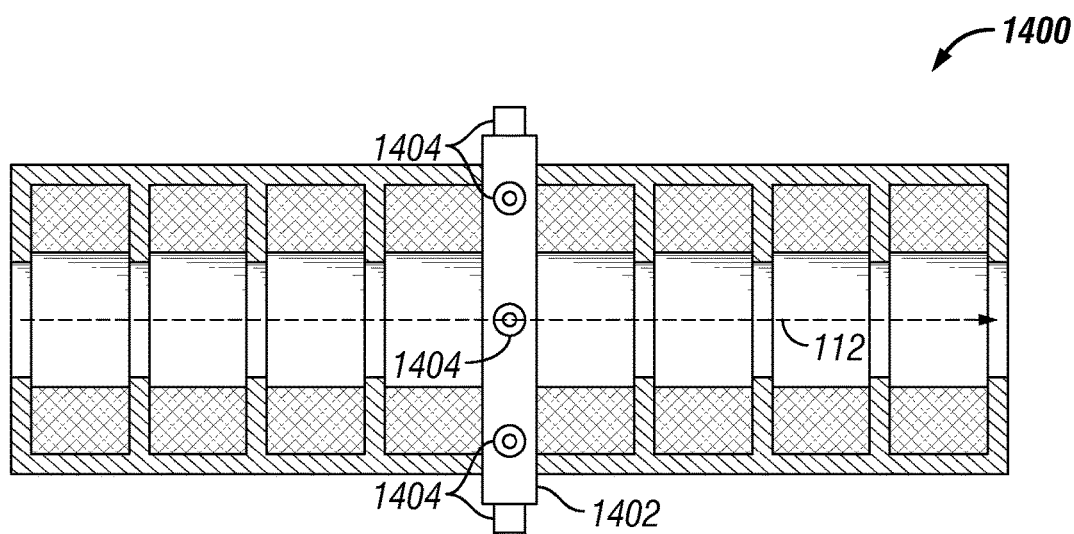
FIG. 14 shows a dielectric loaded accelerator that is coupled to a radial combiner in accordance with one embodiment of the present disclosure.

Various embodiments of the present disclosure are also directed to dielectric loaded accelerators that use other types of couplers. In one embodiment, a coaxial coupler is used to couple the dielectric loaded accelerator to an input microwave power source. A coaxial coupler uses a coaxial port to couple a coaxial cable to the accelerator. In other embodiments, a radial combiner is used to couple the dielectric loaded accelerator to an input microwave power source or a plurality of input microwave power sources. A radial combiner uses two or more coaxial ports to couple one or more coaxial cables to the accelerator. In turn, the coaxial cables are coupled to the input microwave power source. In the coaxial coupler and radial combiner embodiments, power can be radiated directly into the dielectric loaded accelerator through each coaxial port using (i) an un-terminated coaxial cable and/or (ii) a terminated coaxial cable that forms a loop coupler or other radiating antenna. Power is combined and added according to the relative phase relationships between each port, which can be controlled or synchronized independently. FIG. 14 shows a dielectric loaded accelerator 1400 that is coupled to a radial combiner 1402. The dielectric loaded accelerator 1400 is similar to the one shown in FIG. 10. The radial combiner 1402 is positioned along the longitudinal axis 112 of the accelerator. The radial combiner 1402 includes eight ports 1404 (three ports are not shown) positioned radially along the longitudinal axis 112 of the accelerator. The eight ports 1404 couple eight coaxial cables to the accelerator 1400. In other embodiments, a radial combiner with a different number of ports (e.g., 4, 6, 12) may be used. Also, the ports may be placed along the dielectric loaded accelerator in other configurations. For example, a plurality of radial combiners can be placed along the longitudinal axis 112 of the accelerator. Such a configuration may be beneficial for standing wave designs, which are not particularly sensitive to the position of coaxial inputs distributed along the accelerator.

Figure 15:
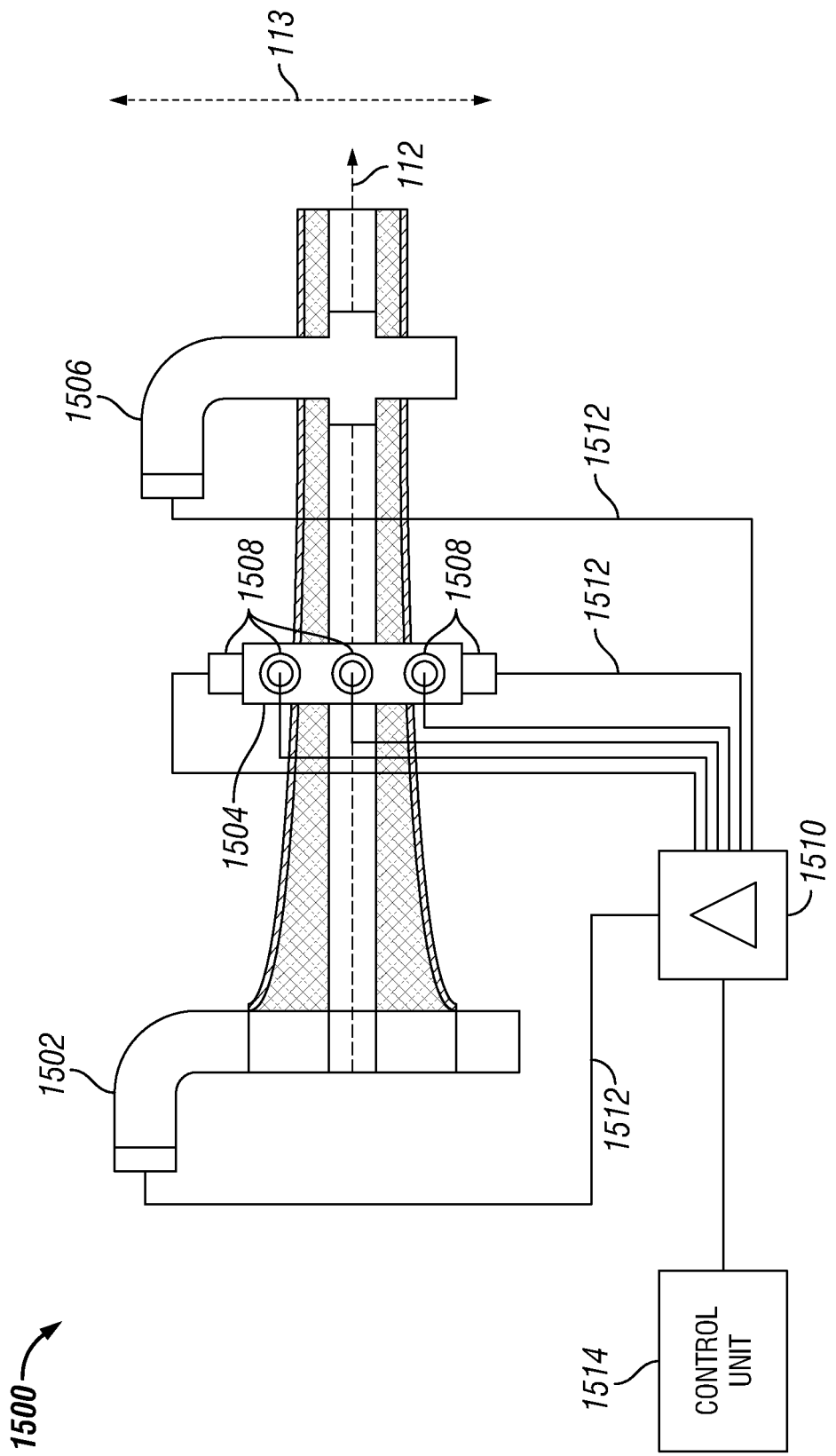
FIG. 15 shows a dielectric loaded accelerator that is coupled to a radial combiner and two waveguide couplers in accordance with one embodiment of the present disclosure.

Illustrative embodiments of the present disclosure can use a number of different coupling configurations together to maintain the microwave field along a length of the dielectric loaded accelerator. For example, a plurality of couplers, such as waveguide couplers or radial combiners, can be used to couple the accelerator to one or more input microwave power sources. Couplers distributed along the length of the accelerator can also be used to compensate for power loss along the length of the accelerator. In a standing wave configuration, the distributed couplers maintain or "pump" the standing waves at positions along the accelerator, while, in a travelling wave mode, distributed couplers can be used to replenish the traveling waves as they travel along the accelerator. FIG. 15 shows a dielectric loaded accelerator 1500 that is coupled to a first waveguide coupler 1502, a second waveguide coupler 1506 and a radial combiner 1504 with eight coaxial ports 1508. The dielectric loaded accelerator 1500 is similar to the ones shown in FIGS. 3 and 12. The first waveguide coupler 1502, the second waveguide coupler 1506 and the coaxial ports 1508 are each coupled to an input microwave power source 1510 via coaxial cables 1512. A suitable coaxial cable 1512 for high temperature and high power operations may be a silicon dioxide ($SiO_2$) coaxial cable. The input microwave power source 1510 may include one or more power supplies that provide an initial input microwave signal to one or more amplifiers. The one or more amplifiers amplify the initial input microwave signal and then transmit an amplified input microwave signal to the accelerator 1500 via the coaxial cables 1512. Each waveguide coupler or coaxial port may have a dedicated power amplifier. In some embodiments, the input microwave power source 1510 is controlled by a control unit 1514, which sets the parameters of the initial microwave input signal and the amplified microwave input signal (e.g., current, voltage, phase and/or frequency).

The waveguide couplers, coaxial couplers, and radial combiners described above can use plungers, tuning posts, or slots to optimize frequency tuning and overall power transmission efficiency to the dielectric loaded accelerator. In some embodiments, the couplers may be tuned as a function of temperature by using moving tuning stubs, tunable materials, and/or the temperature properties of certain dielectric materials. Furthermore, couplers based on reduced height waveguides, dielectric loaded waveguides, bent waveguides, coaxial couplers, or radial combiners (with less coaxial ports) can be used to reduce the transverse dimension of the dielectric loaded accelerator. For example, in FIG. 15, the dielectric loaded accelerator 1500 uses a radial combiner 1504 and waveguide couplers 1502, 1506 with bent waveguides to reduce the transverse dimension 113 of the accelerator.

Figure 16:
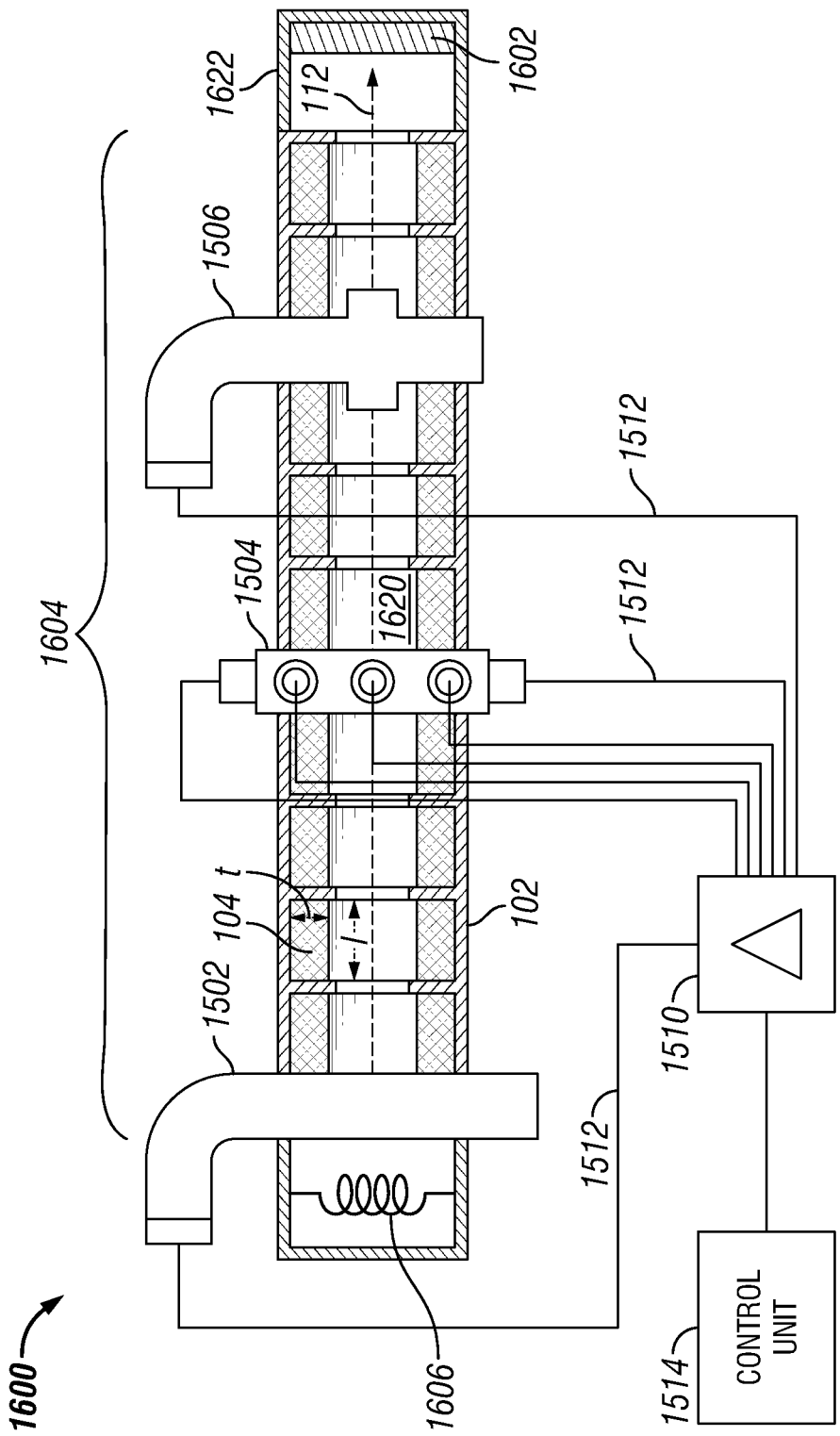
FIG. 16 shows an X-ray generator in accordance with one embodiment of the present disclosure.

Illustrative embodiments of the present disclosure are directed to an X-ray generator. FIG. 16 shows an X-ray generator 1600 that includes a target 1602 for generating X-rays, a dielectric loaded accelerator 1604 for accelerating electrons along a longitudinal axis 112 of the accelerator and towards the target 1602, and an electron source 1606 for providing electrons to the accelerator. The dielectric loaded accelerator 1602 includes an electromagnetic mode with a phase velocity that increases towards the target 1602 and matches a velocity of the electrons accelerated along the longitudinal axis 112. In FIG. 16, the dielectric loaded accelerator 1600 is similar to the accelerator shown in FIG. 10 and operates in a standing wave mode configuration. The dielectric loaded accelerator 1600 can increase the phase velocity towards the target 1602 by (i) decreasing the thickness (t) of each section of dielectric material 104 along the longitudinal axis 112 of the accelerator 1604 or (ii) decreasing the dielectric permittivity ($\in$) of the dielectric material 104 in each section along the longitudinal axis of the accelerator. Any of these approaches can be used, alone or in combination, to increase the phase velocity of the electromagnetic mode of the accelerator 1604. Furthermore, the dielectric loaded accelerator 1604 uses a first waveguide coupler 1502, a radial combiner 1504, and a second waveguide coupler 1506 to couple the microwave input power source 1510 to the accelerator, in a similar manner to the embodiment shown in FIG. 15. Various embodiments of the X-ray generator are not limited to any particular type of accelerator configuration or coupling configuration. For example, the X-ray generator can use any of the accelerator configurations or coupling configurations shown in FIGS. 1-15.

The X-ray generator 1600 also includes an electron source 1606 that generates electrons. The electron source 1606 supplies the electrons that are accelerated by the dielectric loaded accelerator 1604. The electron source 1606 can be biased and "floating" with respect to the remainder of the X-ray generator 1600. In one embodiment, the electron source 1606 is a heated filament (e.g., "hot cathode") that releases electrons when the filament reaches a certain temperature. In various embodiments, the heated filament is made from materials such as tungsten, barium, yttria, and lanthanum hexaboride ($LaB_6$). In other embodiments, the electron source 1606 includes a substrate with a plurality of nano-tips disposed on the substrate (e.g., field emission array formed from nanotubes) or other field emitting arrays formed from metallic or semi-metallic tips. When an appropriate electrical field is applied to the field emitting array, the array releases electrons.

The electrons that are generated by the electron source 1606 are accelerated towards the target 1602 using the accelerator 1604. The target 1602 is configured to generate X-rays when electrons enter the target. To this end, the target 1602 may include a material such as gold, lead, platinum, tungsten, or any other element with a high atomic Z number. When the electrons impact the target 1602 and move through the target, at least some of the electrons generate X-rays (e.g., Bremsstrahlung). In this manner, the X-ray generator 1600 generates X-rays.

The X-ray generator 1600 includes an interior volume 1620 that is defined by a housing 1622. The housing 1622 contains the particle accelerator 1604, the electron source 1606, and the target 1602. The interior volume 1620 of the housing is evacuated (e.g., a vacuum exists in the interior volume) so that electrons can be generated and accelerated towards the target 1602 with minimum interaction with other particles.

Figure 17:
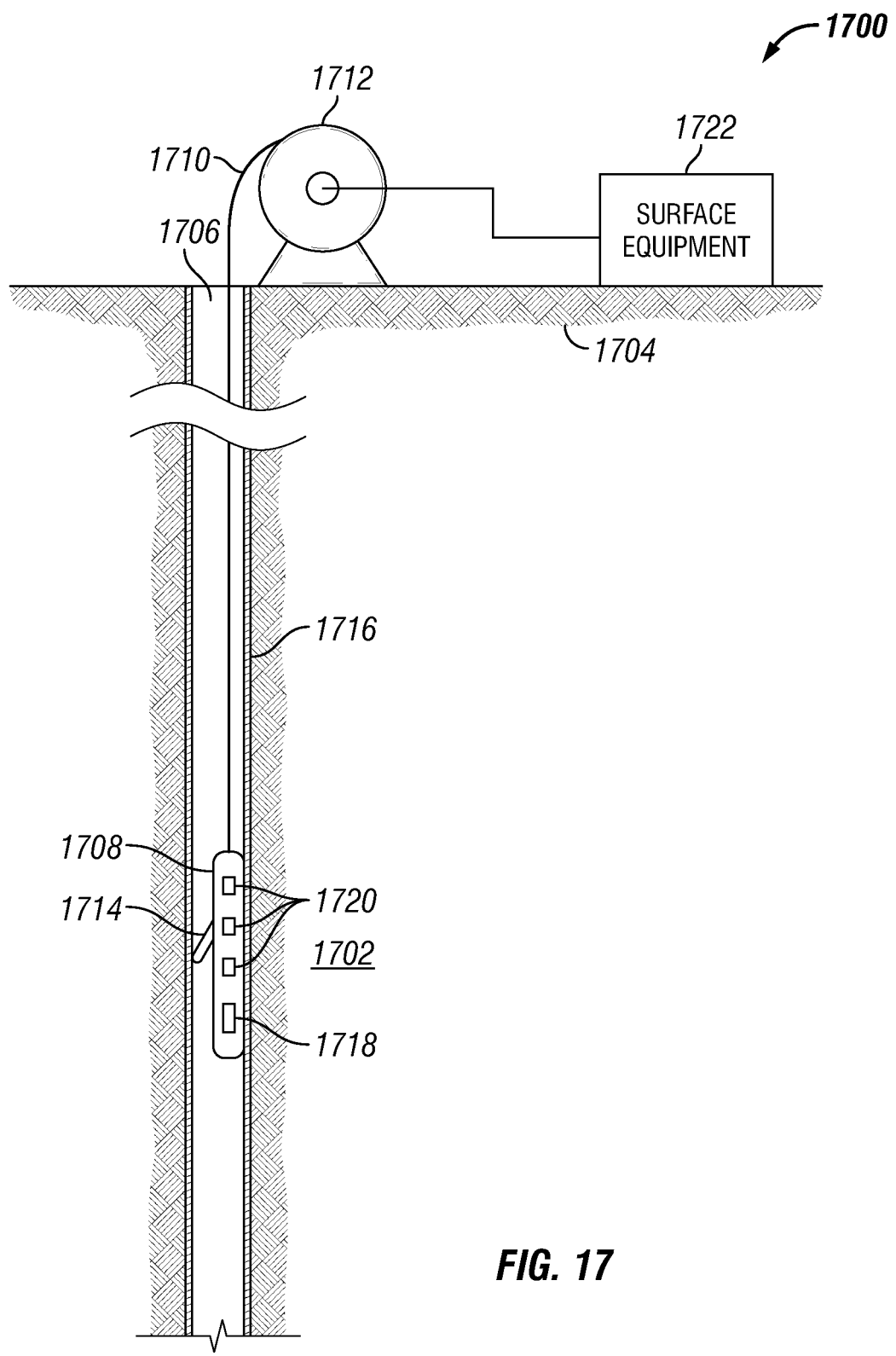
FIG. 17 shows a wireline system in accordance with one embodiment of the present disclosure.

Illustrative embodiments of the present disclosure are directed to oil and gas field applications, such as wireline logging tools. FIG. 17 shows a wireline system 1700 that is used to investigate, in situ, an earth formation 1702 to determine a characteristic of the formation (e.g., characteristics of solids and liquids within the formation). The wireline system 1700 includes a wireline tool 1708 that is suspended on an armored cable 1710 within a wellbore 1706 that traverses the earth formation 1704. A length of the cable 1710 determines the depth of the wireline tool 1708 within the wellbore 1706. The length of cable is controlled by a mechanism at the surface, such as a drum and winch system 1712. In some embodiments, a retractable arm 1714 is used to press the wireline tool 1708 against a wellbore wall 1716. The wireline tool 1708 also includes an X-ray generator 1718 with a dielectric loaded accelerator in accordance with any of the embodiments shown in FIGS. 1-16. The wireline tool 1708 also includes at least one gamma-ray detector 1720. The embodiment shown in FIG. 17 includes three gamma-ray detectors 1720. The wireline system 1700 includes surface equipment 1722 for supporting the wireline tool 1708 within the wellbore 1706. The surface equipment 1722 includes an operator interface with a processing system for controlling and communicating with the X-ray generator and the gamma-ray detectors. Furthermore, although the wireline tool 1708 is shown as a single body in FIG. 17, the tool may include separate bodies.

Figure 18:
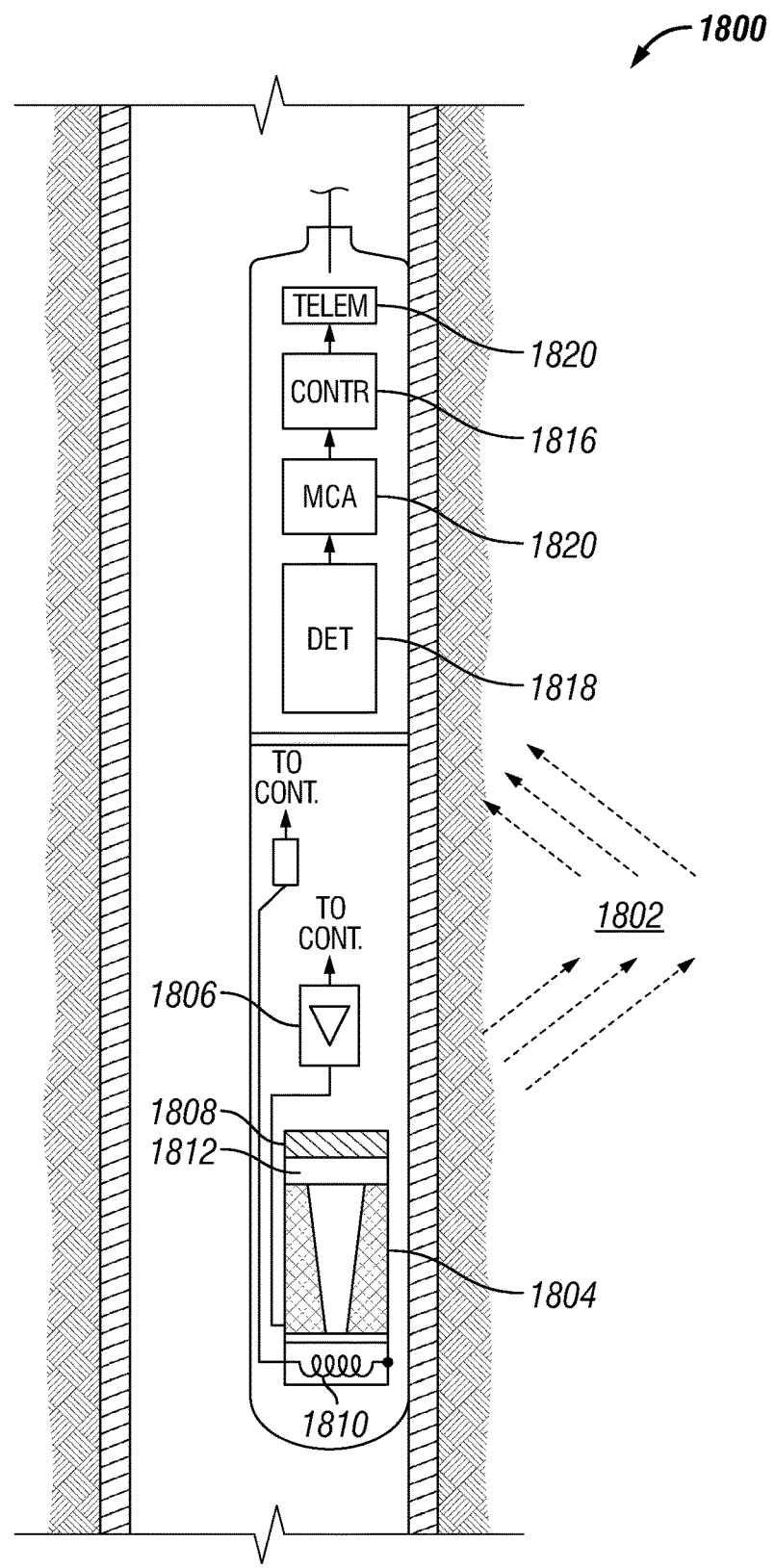
FIG. 18 shows a wireline tool in accordance with one embodiment of the present disclosure.
Figure 19:
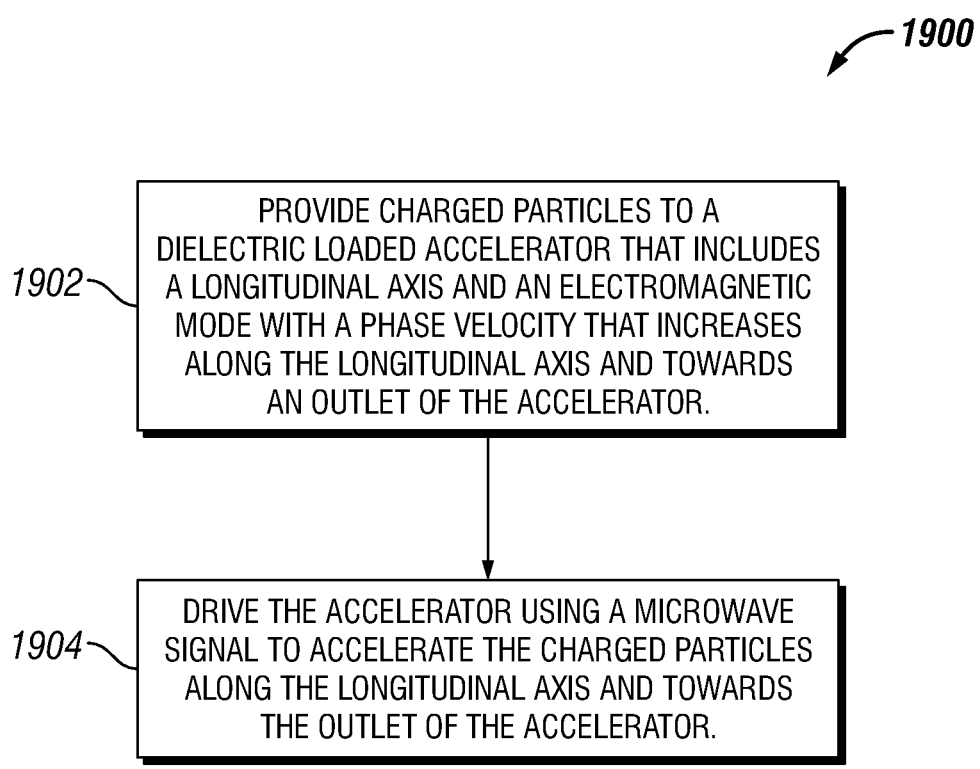
FIG. 19 shows a method for accelerating charged particles using a dielectric loaded accelerator in accordance with one embodiment of the present disclosure.

FIG. 18 shows a wireline tool 1800 in more detail. The wireline tool 1800 includes an X-ray generator 1804 with a target 1808, an electron source 1810 and a dielectric loaded accelerator 1812. The dielectric loaded accelerator 1812 includes an electromagnetic mode with a phase velocity that increases towards the target 1808 and matches a velocity of the electrons accelerated along a longitudinal axis of the accelerator. The dielectric loaded accelerator 1812 can use any of the accelerator configurations or coupling configurations shown in FIGS. 1-16. The dielectric loaded accelerator 1812 is coupled to an input microwave power source 1806 that may include one or more power amplification circuits based on a wide band gap semiconductor material, such as any of the power amplification circuits described in patent application Ser. No. 13/566,539 filed on Aug. 3, 2013, which is incorporated by reference herein in its entirety. The input microwave power source 1806 and the electron source 1810 are coupled to and controlled by a control unit 1816. As explained above, the X-ray generator 1804 generates X-rays by impacting electrons against the target 1808. At least some of those X-rays enter the formation 1802 adjacent the wireline tool 1800.

The wireline tool 1800 also includes at least one gamma-ray detector 1818 for detecting X-rays that scatter back from the formation 1802. In the exemplary embodiment shown in FIG. 18, the gamma-ray detector 1818 uses a scintillator material to detect gamma-rays and X-rays. When X-rays strike the scintillator material, the material produces light with intensity proportional to the energy of the X-ray. The gamma-ray detector also includes a photon detector (not shown) that detects the light and produces an output signal characterizing the detected X-rays (e.g., a photo multiplier tube (PMT)). The output signal is then provided to a multichannel analyzer (MCA) 1820 so that the detected X-rays with different energies are counted. The counting rate and the detector X-ray energy information can be used for evaluation of the formation 1802. In some embodiments, the MCA 1820 may also count the detected X-rays as a function of time. The MCA 1820 is electrically coupled to the control unit 1816 and provides the control unit with an electronic signal characterizing the detected X-rays.

In illustrative embodiments, the control unit 1816 is coupled to a telemetry module 1820 so that the wireline tool 1800 can communicate with surface equipment 1722 through, for example, an armored cable 1710. The surface equipment 1722 may include a processing system configured to interpret the electronic signal characterizing the detected X-rays. The electronic signal and/or the parameters of the signal (e.g., count rate and amplitude) can be communicated to the surface equipment 1722 and used by the processing system to determine characteristics of the formation (e.g., density, porosity, and/or photo-electric effect).

Various embodiments of the present disclosure are not limited to the wireline embodiment shown in FIGS. 17 and 18. In another wireline embodiment, the wireline tool includes a retractable arm that pushes a pad (not shown) against the formation. The X-ray generator and gamma-ray detector are disposed on the pad. This pad configuration facilities detection and measurement of the scattered X-rays.

Illustrative embodiments of the present disclosure are also directed to a method 1900 for accelerating charged particles using a dielectric loaded accelerator. The dielectric loaded accelerator can use any of the accelerator configurations or coupling configurations shown in FIGS. 1-18. In particular, the dielectric loaded accelerator includes a longitudinal axis and an electromagnetic mode with a phase velocity that increases along the longitudinal axis of the accelerator and towards an outlet of the accelerator. Before the method begins, in some embodiments, the dielectric loaded accelerator is tuned to a particular frequency. The tuning can be performed, for example, by applying an electric field to a tunable dielectric permittivity material within the accelerator. At process 1902, charged particles, such as electrons, protons, or ions, are provided to the dielectric loaded accelerator. In the case of electrons, the electrons can be provided from a hot cathode. At process 1904, a microwave signal is used to drive the accelerator. The microwave signal is provided from an input power source. The microwave signal produces a microwave field within the accelerator and accelerates the charged particles along the longitudinal axis and towards the outlet of the accelerator. The phase velocity of the electromagnetic mode of the accelerator is matched to a velocity of the charged particles being accelerated along the longitudinal axis at a plurality of positions along the accelerator. By matching the phase velocity of the accelerator with the phase velocity of the charged particles, the method 1900 efficiently accelerates charged particles. For example, in the case of electrons, the electrons are provided to the accelerator at energies of 0 to 0.1 MeV and are accelerated to energies of 0.1 to 1 MeV (e.g., sub-relativistic velocities). In further embodiments, the accelerator accelerates the electrons to energies up to 1 MeV.

The dielectric loaded accelerators described herein are not limited to any particular application. The dielectric loaded accelerators can be used to accelerate a number of different charged particles, such as electrons, protons and ions. The accelerator can be implemented in surface environments, such as in a laboratory or production facility. The dielectric loaded accelerator can be used in medical fields, such as radio-therapy, radio-surgery and X-ray imaging. Also, the dielectric loaded accelerator can be used in testing fields, such as for cargo scanning, explosives detection, and contraband detection.

Furthermore, the dielectric loaded accelerators described herein are not limited to any particular oil and gas field application. The dielectric loaded accelerator can be used with wireline systems, such as the one shown in FIGS. 17 and 18. Also, the dielectric loaded accelerator described herein can be applied to logging-while-drilling systems (e.g., LWD tools) or measuring-while-drilling systems (e.g., MWD tools). Illustrative embodiments can also be used with any suitable means of conveyance, such as armored cable or coiled tubing.

Some of the processes described herein, such as (i) controlling operation of a dielectric loaded accelerator, (ii) controlling parameters of an initial input microwave signal, (iii) controlling amplification of an initial input microwave signal, (iv) controlling production of electrons, and (v) determining characteristics of an earth formation using an electronic signal characterizing detected X-rays, can be performed at least in part by a control unit and/or a processing system.

The terms "control unit" and "processing system" should not be construed to limit the embodiments disclosed herein to any particular device type or system. The control unit or processing system may include a computer system. The computer system may also include a computer processor (e.g., a microprocessor, microcontroller, digital signal processor, or general purpose computer) for executing any of the methods and processes described above (e.g. processes (i)-(v)).

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. This memory may be used to store, for example, data from the electronic signal characterizing detected X-rays.

Some of the methods and processes described above, including processes (i)-(v), as listed above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Additionally or alternatively, the control unit or processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

What is claimed is:

1. A device for accelerating charged particles, the device comprising:
a dielectric loaded accelerator for accelerating charged particles along a longitudinal axis of the accelerator and towards an outlet of the accelerator, said accelerator comprising;
an elongated body made from a conductive material; and
a dielectric material extending continuously along a length of the accelerator and extending radially inward from an interior surface of the elongated body to a central cavity surrounding said longitudinal axis;
said central cavity being uniform in diameter throughout its length; and
said dielectric material and elongated body being varied in outer diameter along said length of the accelerator such that an electromagnetic mode of the accelerator has a phase velocity that (i) increases towards the outlet of the accelerator and (ii) matches a velocity of the charged particles accelerated along the longitudinal axis.

2. The device of claim 1, wherein the phase velocity of the accelerator along the longitudinal axis of the accelerator is configured to continuously match the velocity of the charged particles accelerated along the longitudinal axis.

3. The device of claim 1, wherein the dielectric material has a thickness that decreases monotonically along the longitudinal axis and towards the outlet of the accelerator.

4. The device of claim 1, wherein the dielectric material has a dielectric permittivity that varies along the longitudinal axis of the accelerator.

5. The device of claim 1, wherein the dielectric material comprises a plurality of layers.

6. The device of claim 5, wherein at least two of the plurality of layers comprise different dielectric permittivity.

7. The device of claim 5, wherein the plurality of layers comprises a dielectric mirror configured to confine electromagnetic fields of a particular frequency within an inner volume of the accelerator.

8. The device of claim 5, wherein at least one layer of the plurality of layers comprises a material with a tunable dielectric permittivity.

9. The device of claim 8, wherein the material with the tunable dielectric permittivity comprises a ferro-electric material.

10. The device of claim 5, wherein at least one layer comprises a conductive element for collecting charge deposited by the charged particles in the dielectric material.

11. The device of claim 1, wherein the dielectric loaded accelerator comprises a plurality of sections that are joined together along the longitudinal axis.

12. The device of claim 1, further comprising:
a plurality of couplers positioned at a plurality of positions along the longitudinal axis of the accelerator and configured to couple the dielectric loaded accelerator to a power source.

13. The device of claim 1, wherein the dielectric material and elongated body are varied stepwise in outer diameter along said length of the accelerator, such that the elongated body and dielectric material transition between regions of constant outer diameter along the length of the accelerator.

14. An X-ray generator comprising:
a target for generating X-rays;
a dielectric loaded accelerator for accelerating electrons along a longitudinal axis of the accelerator and towards the target, said accelerator comprising;
an elongated body made from a conductive material; and
a dielectric material extending continuously along a length of the accelerator and extending radially inward from an interior surface of the elongated body to a central cavity surrounding said longitudinal axis;
said central cavity being uniform in diameter throughout its length; and
said dielectric material and elongated body being varied in outer diameter along said length of the accelerator such that the accelerator comprises an electromagnetic mode with a phase velocity that increases towards the target and matches a velocity of the electrons accelerated along the longitudinal axis; and
an electron source for providing electrons to the accelerator.

15. The X-ray generator of claim 14, wherein the phase velocity of the accelerator along the longitudinal axis is configured to continuously match a velocity of the electrons being accelerated along the longitudinal axis.

16. The X-ray generator of claim 15, wherein the dielectric loaded accelerator comprises a dielectric material with a dielectric permittivity that varies along the longitudinal axis of the accelerator.

17. The X-ray generator of claim 15, wherein the dielectric material has a thickness that decreases monotonically along the longitudinal axis and towards the target.

18. The X-ray generator of claim 14, wherein the X-ray generator is part of a wellbore tool and the X-ray generator generates X-ray radiation that enters an earth formation.

19. The X-ray generator of claim 18, wherein the wellbore tool comprises a gamma-ray detector for detecting X-ray radiation scattered from the earth formation.

20. The X-ray generator of claim 14, wherein the dielectric material and elongated body are varied stepwise in outer diameter along said length of the accelerator, such that the elongated body and dielectric material transition between regions of constant outer diameter along the length of the accelerator.

21. A method for accelerating charged particles along a longitudinal axis of the accelerator, the method comprising:
providing charged particles to a dielectric loaded accelerator comprising:
an elongated body made from a conductive material; and
a dielectric material extending continuously along a length of the accelerator and extending radially inward from an interior surface of the elongated body to a central cavity surrounding said longitudinal axis;
said central cavity being uniform in diameter throughout its length; and
said dielectric material and elongated body being varied in outer diameter along said length of the accelerator such that an electromagnetic mode of the accelerator has a phase velocity that increases along the longitudinal axis of the accelerator and towards an outlet of the accelerator; and
driving the accelerator using a microwave signal to accelerate the charged particles along the longitudinal axis and towards the outlet of the accelerator.

22. The method of claim 21, wherein the phase velocity of the accelerator along the longitudinal axis continuously matches the velocity of the charged particles being accelerated along the longitudinal axis.

23. The method of claim 22, wherein the dielectric material has a thickness that decreases monotonically along the longitudinal axis and towards the outlet of the accelerator.

24. The method of claim 22, wherein the dielectric loaded accelerator comprises a dielectric material with a dielectric permittivity that varies along the longitudinal axis of the accelerator.

25. The method of claim 24, wherein dielectric material comprises a plurality of layers and at least one of the layers comprises a tunable dielectric permittivity material.

26. The method of claim 25, further comprising:
applying an electric field to the dielectric loaded accelerator to tune the tunable dielectric permittivity material.

27. The method of claim 21, wherein the charged particles are electrons and the electrons are accelerated by the dielectric loaded accelerator to a sub-relativistic velocity.

28. The method of claim 21, wherein the dielectric material and elongated body are varied stepwise in outer diameter along said length of the accelerator, such that the elongated body and dielectric material transition between regions of constant outer diameter along the length of the accelerator.

* * * * *

UNITED STATES PATENT AND TRADEMARK OFFICE
CERTIFICATE OF CORRECTION

| | | |
|---|---|---|
| PATENT NO. | : 9,671,520 B2 | Page 1 of 1 |
| APPLICATION NO. | : 14/175703 | |
| DATED | : June 6, 2017 | |
| INVENTOR(S) | : Tancredi Botto et al. | |

It is certified that error appears in the above-identified patent and that said Letters Patent is hereby corrected as shown below:

In the Specification

In Column 1, Line 3 after the title, add the following heading and text:
STATEMENT OF GOVERNMENT INTEREST
This invention was made with government support under DE-SC0007629 awarded by the U. S. Department of Energy. The Government has certain rights in the invention.

Signed and Sealed this
Thirteenth Day of June, 2023

Katherine Kelly Vidal
*Director of the United States Patent and Trademark Office*